US008091213B2

(12) United States Patent
Yuyama et al.

(10) Patent No.: US 8,091,213 B2

(45) Date of Patent: Jan. 10, 2012

(54) INSTALLATION/REMOVAL DEVICE, DISPLAY CHANGE DEVICE, AND DOSING SYSTEM

(75) Inventors: Hiroyuki Yuyama, Osaka (JP); Naoki Koike, Osaka (JP); Tatsuaki Kunimoto, Osaka (JP); Nobuyuki Fujishima, Osaka (JP)

(73) Assignee: Yuyama Mfg. Co., Ltd., Toyonaka-shi (JP)

( * ) Notice: Subject to any disclaimer, the term of this patent is extended or adjusted under 35 U.S.C. 154(b) by 0 days.

(21) Appl. No.: 13/084,299

(22) Filed: Apr. 11, 2011

(65) Prior Publication Data

US 2011/0185565 A1 Aug. 4, 2011

Related U.S. Application Data

(63) Continuation of application No. 11/718,773, filed as application No. PCT/JP2005/020062 on Nov. 1, 2005, now Pat. No. 7,941,915.

(30) Foreign Application Priority Data

Nov. 8, 2004 (JP) ................................ 2004-323148
Feb. 14, 2005 (JP) ................................ 2005-035521

(51) Int. Cl.
*B23Q 15/00* (2006.01)
*G06F 17/00* (2006.01)

(52) U.S. Cl. .............. 29/701; 29/702; 29/703; 700/235; 700/237; 700/226; 700/227; 700/221

(58) Field of Classification Search .................... 29/701, 29/702, 703; 700/235, 237, 225, 226, 227, 700/220, 221
See application file for complete search history.

(56) References Cited

U.S. PATENT DOCUMENTS 3,670,386 A * 6/1972 Davis et al. .................... 29/701
4,677,258 A * 6/1987 Kawashima et al. ...... 178/18.01
5,604,692 A * 2/1997 Yuyama ....................... 708/714
(Continued)

FOREIGN PATENT DOCUMENTS

DE 197 54 542 A1 7/1998
(Continued)

OTHER PUBLICATIONS

Office Action issued May 27, 2010, in Japanese Patent Application No. 2008-27406, filed Feb. 7, 2008 (with English-language translation), and submitted concurrently with Request for Participation in Patent Prosecution Highway (PPH) Program.

*Primary Examiner* — Essama Omgba
(74) *Attorney, Agent, or Firm* — Oblon, Spivak, McClelland, Maier & Neustadt, L.L.P.

(57) ABSTRACT

A display change device is formed by connecting and thereby integrating an installation/removal device and a card display change device together. The card installation/removal device is configured to have at a back side thereof a pressure reception wall, at a further back side of which a position adjustment mechanism part is provided. The position adjustment mechanism part is configured to include a seat member, a moving part, and a drive part. The position adjustment mechanism part is configured to strike and move the card installation/removal device by an eccentric cam. The position adjustment mechanism part moves the eccentric cam far from the pressure reception wall under the condition that a reaction force Fr received by the eccentric cam becomes larger than a force Fa for pulling the moving part toward the pressure reception wall side.

10 Claims, 25 Drawing Sheets

U.S. PATENT DOCUMENTS

| | | | | |
|---|---|---|---|---|
| 5,849,140 | A | 12/1998 | Bilnoski, Jr. | |
| 6,364,517 | B1 | 4/2002 | Yuyama et al. | |
| 6,597,969 | B2 * | 7/2003 | Greenwald et al. | 700/216 |
| 6,701,218 | B2 | 3/2004 | Koike et al. | |
| 7,130,234 | B2 * | 10/2006 | Shionoiri et al. | 365/203 |
| 7,319,633 | B2 * | 1/2008 | Shionoiri et al. | 365/230.06 |
| 7,322,815 | B2 * | 1/2008 | Izzo | 425/447 |
| 7,430,146 | B2 * | 9/2008 | Shionoiri et al. | 365/203 |
| 7,685,004 | B2 * | 3/2010 | Moncrief et al. | 705/2 |
| 7,698,019 | B2 * | 4/2010 | Moncrief et al. | 700/241 |
| 7,808,090 | B2 * | 10/2010 | Shionoiri | 257/679 |
| 7,941,915 | B2 * | 5/2011 | Yuyama et al. | 29/791 |
| 2005/0128827 | A1 * | 6/2005 | Shionoiri et al. | 365/194 |
| 2005/0135181 | A1 * | 6/2005 | Shionoiri et al. | 365/230.06 |
| 2005/0140015 | A1 * | 6/2005 | Shionoiri et al. | 257/773 |
| 2006/0277068 | A1 * | 12/2006 | Shiobara et al. | 705/2 |
| 2007/0104054 | A1 * | 5/2007 | Senshu | 369/47.12 |
| 2009/0203521 | A1 * | 8/2009 | Ishimi et al. | 503/201 |
| 2011/0016427 | A1 * | 1/2011 | Douen | 715/828 |
| 2011/0126279 | A1 * | 5/2011 | Senshu | 726/16 |

FOREIGN PATENT DOCUMENTS

| | | | |
|---|---|---|---|
| DE | 298 18 633 | U1 | 8/1999 |
| EP | 1 247 774 | A1 | 10/2002 |
| JP | 8-281907 | | 10/1996 |
| JP | 9-51922 | | 2/1997 |
| JP | 9-130999 | | 5/1997 |
| JP | 2000-196510 | | 7/2000 |
| JP | 2002-165865 | | 6/2002 |

* cited by examiner (a)

(b)

(a)

(b)

(c)

(a)

(b)

(c)

(a)

(b)

(c)

(a) (b)

INSTALLATION/REMOVAL DEVICE, DISPLAY CHANGE DEVICE, AND DOSING SYSTEM

CROSS REFERENCE TO RELATED APPLICATIONS

The present application is a continuation application of and claims the benefit of priority under 35 U.S.C. §120 from U.S. application Ser. No. 11/718,773, filed May 7, 2007, the entire contents of which are incorporated herein by reference. U.S. application Ser. No. 11/718,773 is a national stage of International Application No. PCT/JP2005/20062, filed Nov. 1, 2005, which is based upon and claims the benefit of priority under 35 U.S.C. §119 from prior Japanese Patent Applications No. 2004-323148, filed Nov. 8, 2004, and No. 2005-035521, filed Feb. 14, 2005.

TECHNICAL FIELD OF THE INVENTION

The present invention relates to an installation/removal device for installing and removing a card fitted to the side surface of a conveyed object and to a display change device including this installation/removal device.

BACKGROUND OF RELATED ARTS

Conventionally, as disclosed in patent document 1 described below, dosing systems capable of collecting and lumping together drugs, medical materials, and the like in a predetermined tray prepared for each patient in accordance with directions given on a prescription have been adopted at medical facilities such as hospitals, dispensing (ethical) pharmacies, and the like.

With the dosing system as described above, prescriptions are given at one time for a large number of patients; therefore, it is required that correspondence between the trays and the patients can be accurately identified. Thus, the dosing system disclosed in patent document 1 described below adopts configuration in which information on a patient assigned to each tray and drugs stored in each tray is marked on a card referred to as a rewrite card, which card is fitted to a card holding member provided on the side surface of the tray.

The dosing system disclosed in patent document 1 described below includes a display change device capable of once removing the card fitted to the side surface of the tray, transmitting it to a writing device and changing display of the information marked on the card, and then returning this card to the tray. This dosing system is configured to, when the tray carried on a predetermined conveyor arrives at a position adjacent to the display change device, tilt the display change device at a predetermined angle so that a roller provided at a region referred to as a contacting portion is brought close to the side surface of the tray and also to rotate this roller by use of a power such as a motor or the like to thereby install and remove the card to and from the card holding member by utilizing a frictional force generated between the roller and the card so as to achieve rewriting on the card.

Patent document 1: Japanese Unexamined Patent Publication No. 2002-165865

SUMMARY OF THE INVENTION

Problem to be Solved by the Invention

The tray used in the dosing system as described above is formed of resin or the like in many cases, and thus variations have occurred in the size and the forming accuracy in some cases. Moreover, since the tray is provided just for storage of drugs, an off-specification tray has been used, in some cases, which is roughly similar in shape to the tray fabricated for this dosing system but slightly different therefrom in the angle of its side surface and the like.

The display change device disclosed in patent document 1 described above rotates the roller provided at the contacting portion and installs and removes a card by use of the frictional force generated between the roller and the card. Thus, even with a slight change in the gap between the card and the roller and in the way in which the roller contacts the card, a power may not be successfully transferred to the card, or an excessively large external force may act on the card. Therefore, when the display change device disclosed in the patent document 1 described above is adopted, the use of a tray having a size or a shape out of a predetermined standard, a failure in installation and removal of the card may occur or the card and the roller may wear.

In view of the problem described above, the present invention has been made, and it is an object of the invention to provide an installation/removal device capable of favorably installing and removing a card fitted to a conveyed object, and a display change device including the installation/removal device, and a dosing system including the installation/removal device.

Means for Solving the Problem by the Invention

The invention provided in view of the problem described above refers to an installation/removal device including: installing and removing means for installing and removing a card fitted to a fitting part provided on a side surface of a conveyed object; and moving means for moving the installing and removing means in a direction approaching or separating from the conveyed object. The installing and removing means has a head part opposing the side surface of the conveyed object. The head part is so supported as to be capable of approaching and separating from the conveyed object. The moving means has a pressing member capable of pressing the installing and removing means toward the conveyed object. The pressing means moves in the direction separating from the installing and removing means while keeping pressing the installing and removing means under the condition that a reaction force acting on the pressing member as a result of pressing the installing and removing means by the pressing member exceeds a predetermined degree.

According to this configuration, even when a conveyed object more or less different in size and shape from the one assumed is adopted, a positional relationship between the conveyed object and the head part can be controlled within a fixed range, thereby preventing the card from being excessively pressed by the head part. Thus, the installation/removal device of the present invention can widely support variations in size, shape, and the like of the conveyed object; therefore, even when the conveyed object more or less different in size and shape is supplied, failure in installing and removing the card to and from the conveyed object and wear of the card and the head part hardly occur.

The invention refers to the installation/removal device, in which the moving means has: a seat member fixed at a predetermined position, a moving part freely movably fitted to the seat member; and a drive part. The moving part is movable in the direction approaching or separating from the installing and removing means and is biased in the direction approaching the installing and removing means. The drive part includes a drive source fitted to the moving part and a pressing member which receives a power from the drive source to make eccentric rotation. An outer circumferential portion of the pressing member is so disposed as to oppose the installing and removing means.

In the installation/removal device of the present invention, the pressing member follows the eccentric rotations and the installing and removing means approaches or separates from the conveyed object side to thereby come to contact the conveyed object. Then, when a reaction force acting on the pressing means becomes larger, while keeping pressing the installing and removing means, the pressing means fitted to the transfer part separates, together with the transfer part, from the installing and removing means. Thus, according to the installation/removal device of the present invention, the card can be prevented from being excessively pressed by the card head part. Therefore, the installation/removal device of the present invention can make contact with the card with an adequate pressing force, and thus even when a conveyed object more or less variable in size and shape is supplied, failure in installing and removing the card to and from the conveyed object and the wear of the card and the head part hardly occur.

The invention refers to the installation/removal device, in which the head part has card moving means for feeding a card in a predetermined direction by making surface contact with the card, and the head part includes gap adjusting means capable of adjusting a gap between the card moving means and the conveyed object.

The installation/removal device of the present invention installs and removes the card while making the head part approach the conveyed object. Thus, when performing a series of operation of once removing the card from the conveyed object and then fitting it again to the conveyed object, it is desirable in order to perform this operation smoothly that, during the time from when the card is removed until when the card is fitted, the installation/removal device maintain approaching the conveyed object to stand by. On the other hand, in installing and removing the card to and from the conveyed object, since a gap between the card installing and removing means and the head part is extremely narrow, the card moving means provided at the head part and the conveyed object rub against each other during the standby state for fitting the card, thus possibly resulting in the wear of the card installing and removing means and the conveyed object.

However, the installation/removal device of the present invention includes the gap adjusting means, and thus can adjust the gap between the card moving means and the conveyed object. Thus, in an operation of installing and removing of the card, the installation/removal device of the present invention can narrow down the gap between the card moving means and the conveyed object to adjust it suitable for card installation and removal to thereby accurately install and remove the card. Further, the installing and removing device of the present invention can widen the gap between the card moving means and the conveyed object during the standby state in preparation for the card installation and removal to thereby protect the card installing and removing means and the conveyed object from the wear.

The invention refers to the installation/removal device, in which the head part has card moving means for feeding a card in a predetermined direction by making surface contact with the card. The card moving means is so supported as to be swingable with respect to the head part and is capable of changing a posture thereof so as to be oriented along the side surface of the conveyed object.

The installation/removal device of the present invention has the card moving means for feeding the card in the predetermined direction by making surface contact with the card. However, it is concerned that, if the card moving means does not make surface contact properly, a power is not successfully transmitted to the card, thus resulting in failure to feed the card smoothly or resulting in shifting of the card feed direction. Moreover, if the card moving means does not make surface contact properly, the power acts on only part of the card moving means or the card in a biased manner, thus resulting in a possibility of wear focused only one part of the card moving means or the card.

Based on this knowledge, in the installation/removal device of the present invention, the card moving means is so configured as to be swingable with respect to the head part. Thus, in the installation/removal device of the invention, the card moving means properly makes surface contact with the card. Therefore, according to the installation/removal device of the present invention, the card can be smoothly fed in the predetermined direction, and also the wear can be prevented from being focused on one part of the card moving means or the card.

The invention provided based on the same knowledge refers to the installation/removal device which is so supported as to be swingable with respect to the conveyed object and is capable of changing the posture thereof so as to be oriented along the side surface of the conveyed object.

The installation/removal device of the present invention itself is so configured as to be swingable with respect to the conveyed object. Thus, in the installation/removal device of the present invention, the head part can properly make surface contact with the card, thereby permitting the card to be fed smoothly in the predetermined direction and preventing the wear from being focused on one part of the card moving means or the card.

The invention according to claim 6 refers to the installation/removal device, in which the installing and removing means has a card passage for feeding and returning the card to and from the head part. The card passage is provided with card feed means capable of feeding and returning the card along a direction in which the card passage extends by directly or indirectly making contact with the card.

According to this configuration, the card fed into the card passage can be reliably and smoothly fed in the predetermined direction.

The invention refers to the installation/removal device, which is used for installing and removing the card to and from the conveyed object, in which the conveyed object has formed on one or a plurality of side surfaces a fitting part for fitting a card and is provided with: an insertion port that permits removing and inserting the card from and in the fitting part by sliding the card along the side surface in a predetermined installation and removal direction; and a closing member for closing part or all of the insertion port. The insertion port is usually closed by the closing member and is opened by pressing inwardly from the outer side of the side surface. The installation/removal device has release means that has an installation and removal side thereof approach the side surface of the conveyed object to thereby press the closing member and thus open the insertion port.

According to this configuration, only by making the installing and removing means approach the side surface of the conveyed object and pressing the closing member of the conveyed object by the release means, the insertion port of the conveyed object can be opened to provide a condition that permits installing and removing the card. Therefore, according to the present invention, an installation/removal device can be provided which is capable of easily and smoothly installing and removing the card.

The invention refers to a display change device including: writing means for writing predetermined information onto the card; and the installation/removal device according to any of claims 1 through 7. The installation/removal device is so connected as to be capable of receiving and delivering the card from and to the writing means.

According to this configuration, a series of operation including card installation and removal and operation of writing predetermined information onto this card can be performed smoothly.

The invention refers to a display change device including: display changing means for changing display on a card fitted to a fitting portion provided on a side surface of the conveyed object; and moving means for moving the writing means in a direction approaching or separating from the conveyed object, the display changing means having a display change head part opposing the side surface of the conveyed object, the display change head part being so supported as to be capable of approaching and separating from the conveyed object, the moving means having the pressing member capable of pressing the installing and removing means toward the conveyed object, the pressing means moving in the direction separating from the installing and removing means while keeping pressing the installing and removing means under the condition that a reaction force acting on the pressing member as a result of pressing the installing and removing means by the pressing member exceeds a predetermined degree.

According to this configuration, even when the conveyed object more ore less different in shape or size from the one assumed is adopted, the positional relationship between the conveyed object and the head part can be controlled within a fixed range, thereby permitting preventing the card or the conveyed object from being excessively pressed by the display change head part. Thus, the display change device of the invention can widely support variations in size and shape of the conveyed object; therefore, even when the conveyed object more or less different in size and shape is supplied, failure in changing display information on the card for the conveyed object and the wear of the card or the display change head part hardly occur.

The invention refers to the display changing, in which the display change head part may be capable of changing display information on the card by moving the card relative to the display changing means.

The invention refers to the display change device, in which the card is a rewrite card, and in which the information on the card is erased and written by the writing means.

In the present invention, as the card, the rewrite card is adopted, so that display on the rewrite card can be changed by the writing means. Thus, according to the present invention, the card can be used repeatedly, thereby permitting suppressing the running costs of appliances adopting the display change device.

In the display change device, the card may receive and display predetermined information or data including the information, and the display changing means may include transmission means capable of transmitting to the card predetermined information or data including the information.

The invention refers to a dosing system including: conveyed object supply means for supplying a conveyed object capable of storing drugs; drug supply means for supplying predetermined drugs to the conveyed object supplied from the conveyed object supply means; and the display change device, in which installation and removal operation for the card fitted to the conveyed object and writing operation of writing predetermined information on the card can be performed by the display change device.

According to this configuration, a dosing system capable of accurately performing card installation and removal and writing on the card even for those conveyed objects that are more or less variable in size, shape, and the like with respect to the standard.

Effects of the Invention

According to the present invention, an installation/removal device can be provided in which, even when the conveyed object more or less different in size and shape is supplied, failure in installing and removing the card to and from the conveyed object and wear of the card and the roller hardly occur. Moreover, according to the present invention, a display change device can be provided which is capable of smoothly performing a series of operation such as card installation and removal, operation of writing predetermined information onto this card, and the like. Further, according to the present invention, a dosing system can be provided which is capable of accurately performing card installation and removal and writing of predetermined information even for the conveyed object more or less variable in size, shape, or the like with respect to the predetermined standard.

PREFERRED EMBODIMENTS OF THE INVENTION

Next, an installation/removal device and a card display change device including this device as one embodiment of the present invention will be described in detail, referring to the drawings. In FIG. 1, a reference numeral 1 denotes the display change device. The display change device 1 removes a card 13 fitted to a tray 10 (conveyed object) disposed at a position adjacent thereto, rewrites the information marked on this card 13, and then returns it to the tray 10 side.

The tray 10 adopted in the present embodiment is a container formed of resin or the like in a box-like shape having the top side thereof open as shown in FIG. 4. The tray 10 has on a side surface 11 and a side surface 12 opposing thereto fitting parts 14 for storing the card 13, and the card 13 is stored in the fitting part 14 on either the side surface 11 side or the side surface 12 side (the side surface 11 side in FIG. 4). The fitting part 14 is configured to be provided with a groove 14*a* and an insertion port 14*b* so that the card 13 can be removed and inserted by sliding the card 13 along the side surface 11 or the side surface 12. The groove 14*a* is so provided as to encompass the position adjacent to the upper, lower, and right sides of the fitting part 14 and is a space so slit as to permit storage of the card 13 formed between the side surfaces 11 and 12, when the side surfaces 11 and 12 are viewed from the front as shown in FIG. 4. The insertion port 14*b* is formed at a position adjacent to the left side of the fitting part 14 and is a slit-like opening extending vertically, when the side surfaces 11 and 12 are viewed from the front as shown in FIG. 4A.

On the outer side of the insertion port 14*b*, that is, at a position adjacent to the left side of the insertion port 14*b* in the posture shown in FIG. 4A, a projecting part 17 (closing member) is provided. The projecting part 17 is a portion projecting outwardly from the tray 10 in an angular shape with its top located at a substantially vertically central portion of the insertion port 14*b* as shown in FIG. 5. The projecting part 17 is usually provided with its projecting portion located at a position adjacent to the opening area of the insertion port 14*b* for preventing the card 13 stored in the fitting part 14 from dropping out through the insertion port 14*b*. The projecting part 17 is bent inwardly of the tray 10 by being pressed in the direction from the outer side of the tray 10 to the inner side thereof as shown by an arrow F in FIG. 5, thereby permitting the card 13 to be entered and exit through the insertion port 14*b*.

As the card 13, the one referred to as a "rewrite card" is typically adopted. The rewrite card here is a card one which permits recording on the recording surface thereof, by use of a predetermined rewriting device, desired information such as, character information, graphic information, a bar code, and the like, and changing display thereon over several hundreds of times. The rewrite cards typically include those referred to as a leuco-type and those referred to as a cloudy-type, on both of which characters can be written and erased by adding specific temperature thereto. The leuco-type rewrite card is a card capable of displaying predetermined information thereon through the reaction between a leuco dye and a developer composing the recording surface thereof. The cloudy-type rewrite card is a card including a recording surface that has formed on a reflective layer thereof a transparent functional layer on which a protective layer is further provided. The leuco-type rewrite card has a functional layer formed of a polymer binder and a low-molecular substance dispersed therein and made of a higher fatty acid or the like, and the aggregation state of the low-molecular substance in the binder forming the functional layer changes into a less porous state and a very porous state, depending on how heat is added. The leuco-type card appears white and cloudy as a result of irregular reflection when light passes through the very porous portion of the functional layer, whereby predetermined information (image) is displayed through contrast between the transparent portion and the cloudy portion. In the present embodiment, the leuco-type rewrite card is adopted as the card 13.

Marked on the card 13 can be: for example, as shown in FIG. 4, a ward name 13*a* and a room name 13*b* where a patient assigned to the tray 10 resides, a dosing date 13*c*, a patient's name 13*d*, gatagana characters 13*e*, and an ID number 13*f* plus card 13 rewriting frequency 13*g*, and the like. Moreover, on the card 13, by use of a bar code 13*h*, a two-dimensional bar code, or the like, data can be appropriately recorded which includes the above-mentioned various information, a patient's sex, age, address, phone number, insurance card number, dosing history, medical history, disease state, height, weight, a prescription, an injection prescription, comments from a doctor or a pharmacist, and precautions or the like at the time of dosing or the like.

The display change device 1 is so disposed, as shown in FIG. 2, as to be oriented along a conveyor device 15*a* conventionally known, such as a belt conveyor, a roller conveyor, or the like. The display change device 1 is mainly divided into an installation/removal device 2 (installing and removing means) and a card display change device 3 (writing means). The installation/removal device 2 is a portion where installation and removal operation of installing and removing the card 13 to and from the side surface 11 or the side surface 12 of the tray 10 (conveyed object) is performed. The card display change device 3 is a device that is connected to the installation/removal device 2 and that performs display change operation of erasing information displayed on the display surface of the card 13 transmitted from the installation/removal device 2 and writing new information. The display change device 1 performs a series of operation including: removing the card 13 from the side surface 11 or the side surface 12 of the tray 10, feeding this card 13 to the card display change device 3 to perform the display change operation, and returning again the card 13 subjected to the display change operation to the side surface 11 or the side surface 12 of the tray 10.

The installation/removal device 2 is box-shaped as shown in FIG. 2, and is stored in a case 20 whose conveyor device 15*a* side opens in such a manner that the installation/removal device 2 and the display change device 3 are coupled together. The installation/removal device 2 is mainly divided, as shown in FIG. 1 and the like, into a main body part 25 and a position adjustment mechanism part 100 (moving means). The main body part 25 is mainly divided into a head part 21, a card feed part 22, and a drive part 24 that functions as a drive source for these parts. The head part 21 is provided for removing and inserting the card 13 from and in the fitting part 14 provided on the side surfaces 11 and 12 of the tray 10.

To describe it more specifically, the installation/removal device 2 has the main body part 25 so disposed as to be oriented along the conveyor device 15*a* as shown in FIG. 6. The installation/removal device 2 is so configured as to have the drive part 24 at a substantially central portion of the main body part 25 in the extending direction thereof, have the head part 21 disposed downstream of the drive part 24 in the conveyance direction of the tray 10 running on the conveyor device 15*a*, and have the card feed part 22 disposed upstream thereof in the conveyance direction of the tray 10.

As shown in FIGS. 1 to 3, the main body part 25 has frame plates 23*a* and 23*b* of metal arranged at the top and bottom thereof, has the head part 21 provided at the front 25*a* side (conveyor device 15*a* side), and has a pressure reception wall 23*e* provided at a back 25*b* side (position adjustment mechanism part 100 side). The main body part 25 is formed by fixing a support plate 23*c* and a support shaft 23*d* disposed at one longitudinal end side thereof (hereinafter, referred to as a boundary edge 25*c* side as appropriate) and the pressure reception wall 23*e* and a support plate 23*f* disposed at the other side (hereinafter, referred to as a terminal edge 25*d* side as appropriate) of the frame plates 23*a* and 23*b* in such a manner that each of them bridges between the frame plates 23*a* and 23*b*.

The installation/removal device 2 is installed in such a posture that the head part 21 faces the conveyor device 15*a* side and so that the longitudinal direction of the main body part 25 is oriented along the conveyor device 15*a*. A gap between the frame plates 23*a* and 23*b* is adapted to be approximately a little wider than a height H of the card 13. The main body part 25 is so supported as to be freely turnable in directions approaching and separating from the conveyor device 15*a* via a support shaft 26 vertically extending and provided at a region located at the boundary edge 25*c* side, that is, on the left side in the state shown in FIG. 3 plus at the back 25*b* side of the main body part 25. That is, the display change device 1 can turn about the support shaft 26 in the directions approaching and separating from the conveyor device 15*a* and the side surface 11 or the side surface 12 of the tray 10 conveyed by the conveyor device 15*a*.

The main body part 25 is structured so that the frame plates 23*a* and 23*b* are supported by the support plate 23*c* and the support shaft 23*d* disposed at the end portion at the boundary edge 25*c* side and by the pressure reception wall 23*e* and the support plate 23*f* disposed at the end portion at the terminal edge 25*d* side.

The pressure reception wall 23*e* is fixed to a region located at the terminal edge 25*d* plus at the back 25*b* side when the installation/removal device 2 is installed. The pressure reception wall 23*e* forms a wall surface vertically arranged between the frame plates 23*a* and 23*b*, opposing the position adjustment mechanism part 100.

The position adjustment mechanism part 100 is mainly divided into a seat member 101, a moving part 102, and a drive part 103, as shown in FIG. 10. The seat member 101 is a portion fixed to the case 20 and other members. The seat member 101 is a bat-like member having an area 104 which is surrounded by side walls 101*a* to 101*d* formed by bending the four sides of a metal plate in the same direction and whose top surface side is open. The seat member 101 has on the bottom surface thereof an opening part 105. The seat member 101 is horizontally fixed to the case 20 with a bottom part thereof facing downward.

The moving part 102 has: a base part 106 formed, as is the case with the seat member 101, by bending a metal plate into a base shape; and overhanging parts 107 and 107 outwardly overhanging from the both sides of the base part 106. The overhanging parts 107 and 107 are respectively provided with sliding grooves 108 and 108 extending in the same direction. The moving part 102 is so disposed as to be stored within the area 104 of the seat member 101 and extends across the opening part 105 provided in the bottom surface the seat member 101, with the sliding grooves 108 and 108 respectively extending in directions approaching and separating from the pressure reception wall 23*e* provided in the main body part 25 of the installation/removal device 2. The moving part 102 is fitted inside the seat member 101 with screws 110 and 110 which are inserted from above the sliding grooves 108 provided on the overhanging parts 107 and 107 and then threaded into the bottom surface of the base part 106. The moving part 102 is fitted with the screws 110 and 110 with such a strength that avoids removal of the moving part 102 from the base part 106 plus with such a strength that permits the moving part 102 to be freely slidable over the base part 106. Thus, the moving part 102 can slide in the directions approaching and separating from the pressure reception wall 23*e*.

The moving part 102 is connected to the seat member 101 via a spring 111. More specifically, the spring 111 has one end side thereof fixed to the side wall 101*a* of the seat member 101 opposing the pressure reception wall 23*e* and has the other side thereof fixed to the side surface of the base part 106. Thus, the moving part 102 is biased toward the side wall 101*a* side by the spring 111, and thus the side surface of the moving part 102 usually contacts the side wall 101*a*.

To the moving part 102, two sensors 117 and 118 are fitted via a support plate 116 fitted to the side of the base part 106 as shown in FIG. 3. The sensor 117 transmits a detection signal when an eccentric portion 115 of an eccentric cam 112 (pressing means) of the drive part 103, to be described later, is located at a position closest to the pressure reception wall 23*e*, as shown in FIG. 9. The sensor 118 transmits a detection signal when the eccentric cam 115 is located at a position farthest from the pressure reception wall 23*e*, as shown in FIG. 6. The sensor 117 is fitted at a position that permits detection of the eccentric portion 115 when the eccentric portion 115 is located closest to the pressure reception wall 23*e* of the main body part 25. The sensor 118 is fitted at a position that permits detection of the eccentric portion 115 when the eccentric portion 115 is located farthest from the pressure reception wall 23*e* of the main body part 25.

The drive part 103 has a main part thereof composed of the eccentric cam 112 and a motor 113, and is fitted integrally to the moving part 102. To describe it more specifically, the motor 113 is a power source of the drive part 103, and has the rotation axis thereof so fixed as to project from the rear side to the front side (from the lower side to the upper side) of the base part 106 of the moving part 102.

The motor 113 is rotatable in the forward direction (the direction of an arrow A in FIG. 1) or the opposite direction (the direction of an arrow B in FIG. 1) in accordance with the power distribution direction. To the rotation axis of the motor 113, the eccentric cam 112 is so fitted as to be rotatable horizontally with the seat member 101. The eccentric cam 112 is a plate cam so called a plate cam or a circumferential cam that is represented by a mushroom cam, a tangent cam, a disk cam, a mushroom cam, a triangular cam, and the like. In the present embodiment, the mushroom cam is adopted as the eccentric cam 112.

The rotation axis of the motor 113 is connected to the eccentric position of the eccentric cam 112, and the eccentric portion 115 is usually located at a position away from the pressure reception wall 23*e* of the main body part 25. Then, when the motor 113 is actuated, as shown in FIG. 6, the eccentric cam 112 turns about the rotation axis of the motor 113 whereby an area at the eccentric portion 115 side comes close (approaches) to the pressure reception wall 23*e* and eventually the contoured portion of the eccentric cam 112 contacts the pressure reception wall 23*e*. When the rotation axis of the motor 113 is further rotated, the main body part 25 is pressed and thus moved by the contoured portion of the eccentric cam 112, whereby the main body part 25 turns about the support shaft 26 as shown by an arrow B in FIG. 7 and the head part 21 thereof approaches the tray 10 located at a position adjacent to the installation/removal device 2.

The installation/removal device 2 utilizes a power transmitted from the drive part 24 to the head part 21 or the card feed part 22 to remove and insert the card 13 from and in the fitting part 14 of the tray 10 and also to move the card 13. The drive part 24 has, as a power source, a motor 18 fitted to the substantially central portion of the main body part 25 in the extending direction thereof, and transmits a torque to the head part 21 and the card feed part 22. The head part 21 forms a main part of an installing and removing mechanism for installing and removing the card 13 to and from the fitting part 14 provided on the side surfaces 11 and 12 of the tray 10. The head part 21 has: as shown in FIG. 2, an output shaft 45 that rotates upon receiving a torque transmitted from the motor 18; and a roller 58 (card moving means) integrally fitted thereto. By rotating the roller 58 while keeping it in surface contact with the card 13, the head part 21 can remove (unload) the card 13 from the fitting part 14 of the tray 10 and insert the card 13 transmitted from the card feed part 22 side in the fitting part 14.

The card feed part 22 has a main part thereof composed of; a card passage 70 formed of such a space that permits passage of the card 13 therethrough; and a card feed mechanism 75. The card passage 70 is composed of: guide members 61 and 61 formed in a band-like shape and fitted to the frame plates 23*a* and 23*b*; and a guide frame 71 (installing and removing side wall surface) and a guide frame 72 (pressure receiving side wall surface) fitted across between the frame plates 23*a* and 23*b*. The card passage 70 is a slit-like passage that is warped in a substantially "S" shape that connects together a head side card port 60 formed at a position adjacent to the head part 21 plus at the front 25*a* side of the main body part 25 and a feed-side card port 76 provided at a boundary formed with the card display change device 3. The feed-side card port 76 is an opening which is formed vertically long and slit to such a degree that permit passage of one card 13 and which opening is located at a terminal end portion of the main body part 25 at the boundary edge 25*c* side plus at a substantially central portion of the main body part 25 in the thickness direction thereof, that is, at the middle portion between the front 25*a* side and the back 25*b* side.

The card feed mechanism 75 has a main part thereof composed of; roller shafts 81, 82, and 83 disposed at position adjacent to the card passage 70 at the back 25*b* side in such a manner as to be spaced part from one another at predetermined intervals; and roller shafts 85 and 86 disposed at position adjacent to the card passage 70 at the back 25*b* side. The roller shafts 81 to 83 are respectively so fitted as to be rotatable relative to the frame plates 23*a* and 23*b*. At a substantially central portion of the roller shafts 81 to 83 in the axial direction thereof, roller 87 to 89 (card feed means) of rubber are fitted. The rollers 87 to 89 rotate integrally with the roller shafts 81 to 83, respectively, and are used for feeding, in a predetermined direction, the card 13 introduced into the card passage 70 while making surface contact with the card 13. The rollers 87 to 89 are so configured as to be exposed toward the card passage 70 side through a roller-exposing window 77 provided at the guide frame 71 disposed at the front 25*a* side so that the rollers 87 to 89 can make surface contact with the card 13 running inside the card passage 70.

On the other hand, the roller shafts 85 and 86 are respectively so fitted as not to be rotatable relative to the frame plates 23*a* and 23*b*. At a substantially central portion of the roller shafts 85 and 86 in the axial direction thereof, assist rollers 91 and 92 are respectively so fitted as not to be rotatable relative to the roller shafts 85 and 86. The assist rollers 91 and 92 are disposed along the extending direction of the card passage 70 in such a manner as to be spaced apart from each other with a predetermined interval, and also are disposed at positions respectively corresponding to the position between the rollers 87 and 88 and the position between the rollers 88 and 89 described above. The assist rollers 91 and 92 are rollers for assisting the flow of the card 13 inside the card passage 70.

Next, operation performed by the display change device 1 of the present embodiment will be described referring to the drawings. The operation of the display change device 1 is controlled by a controller, not shown. Upon detection that supply of the tray 10 to the conveyor device 15*a* has been started, the controller activates the conveyor device 15*a*, whereby the tray 10 is conveyed further downstream. Upon confirmation that the tray 10 has arrived at the front side of the display change device 1, the control means stops the conveyor device 15*a*. Subsequently, in order to remove the card 13 fitted to the tray 10, the control means actuates the position adjustment mechanism part 100 and brings the head part 21 of the installation/removal device 2 close to the fitting part 14 of the tray 10.

To describe it more specifically, when the tray 10 arrives at a position adjacent to the head part 21 of the installation/removal device 2, the controller supplies a power to the motor 113 of the position adjustment mechanism part 100 to rotate the rotation axis of the motor 113 in the forward direction as shown by an arrow A of FIG. 6. Consequently, the eccentric cam 112 connected to the motor 113 starts its eccentric rotation, and eventually a contoured portion of the eccentric cam 112 hits the pressure reception wall 23*e* of the installation/removal device 2 as in FIG. 7.

Further rotation of the motor 113 causes the installation/removal device 2 and the display change device 1 connecting having therein this connected to the card display change device 3 to start to rotate about the support shaft 26 as shown by the arrow B in FIG. 7. Further rotation of the motor 113 causes the head part 21 of the installation/removal device 2 to come to contact the side surface 11 or the side surface 12 of the tray 10, so that the installation/removal device 2 cannot come any closer to the tray 10. That is, when the head part 21 of the installation/removal device 2 contacts the side surface 11 or the side surface 12 of the tray 10, the main body part 25 is put into a state in which it has turned to its movable limit, that is, a state in which it hits the side surface 11 or the side surface 12 of the tray 10 and thus cannot turn any further.

Here, the motor 113 of the drive part 103 turns until the eccentric portion 115 of the eccentric cam 112 is detected by the sensor 117. That is, when the motor 113 rotates in the forward direction (in a direction of an arrow A in FIG. 8), that is, in the direction in which the eccentric portion 115 comes close to the pressure reception wall 23*e*, a power is distributed to the motor 113 until the eccentric portion 115 is detected by the sensor 117 installed at the pressure reception wall 23*e* side. Thus, the eccentric cam 112 continues to turn even after the main body part 25 has reached the movable limit. Therefore, a reaction force Fr acting on the moving part 102 in the direction separating from the side wall 101*a* as a result of pressing the pressure reception wall 23*e* of the main body part 25 by the eccentric cam 112 becomes larger than a tensile force for pulling the moving part 102 toward the side wall 101*a* by the spring 111 that connects together the seat member 101 and the moving part 102.

Here, as described above, the moving part 102 is usually biased toward the side wall 101*a* side by the spring 111. However, when an external force (reaction force Fr) larger than the tensile force Fa of the spring 111 acts on the moving part 102 against the tensile force Fa, the moving part 102 separates from the side wall 101*a* along the sliding groove 108 as shown by an arrow C in FIG. 8. Thus, when the eccentric cam 112 attempts to turn further under the condition that the main body part 25 has rotated to the movable limit, the reaction force Fr acting on the moving part 102 becomes larger than the tensile force Fa for pulling the moving part 102 toward the side wall 101*a* side, so that the moving part 102 is pressed away toward the side wall 101*b* side by being guided by the sliding groove 108. When the eccentric portion 115 of the eccentric cam 112 comes to contact the pressure reception wall 23*e* of the main body part 25 as in FIG. 9, the installation/removal device 2 has the roller 58 of the output shaft 45 composing the head part 21 come into close contact, with an adequate pressure, with the surface of the card 13 fitted to the fitting part 14 of the tray 10. In another word, the moving part 102 escapes from the side wall 101*a* side against the tensile force Fa by the spring 111, whereby the pressure acting on the main body part 25 by the eccentric cam 112 is relieved and thus the roller 58 comes into moderately close contact with the card 13.

As in FIG. 9, when the eccentric portion 115 of the eccentric cam 112 faces the pressure reception wall 23*e* side, the eccentric portion 115 is detected by the sensor 117 and power distribution to the motor 113 is stopped. Subsequently, the controller starts power distribution to the motor 18 as a drive source for the installation/removal device 2. When the motor 18 is supplied with a power and then the rotation axis starts forward rotation, the torque of the motor 18 is transmitted to the head part 21, whereby the output shaft 45 starts to rotate in the forward direction (a direction of an arrow F in FIG. 9). As a result, the card 13 fitted to the fitting part 14 of the tray 10 moves in the direction along the side surface 11 or the side surface 12 as shown by the arrow fin FIG. 9, and exits through the insertion port 14*b*. The card 13 exiting through the insertion port 14*b* is fed into the card passage 70 formed in the card feed part 22 through the head side card port 60 located at the position adjacent to the head part 21.

The card 13 runs inside the card passage 70 in the feed direction (a direction of an arrow G in FIG. 9) by the rollers 87 to 89 rotated by the power transmitted from the motor 18, and then is fed to the card display change device 3 through the feed-side card port 76. The card display change device 3 changes the display of information written on the recording surface of the card 13 fed from the installation/removal device 2 and then returns the card 13 to the feed-side card port 76.

At an appropriate timing, such as at a timing when the card 13 is fed to the card display change device 3, at a timing when the display on the card 13 is changed, or the like, the controller changes the state of power distribution to the motor 18 to rotate the rotation axis of the motor 18 in the direction opposite to the previous direction. As a result, the rollers 87 to 89 of the card feed part 22 of the installation/removal device 2 and the roller 58 of the head part 21 start to rotate in the direction opposite to the rotation direction at the time of removing the card 13. Thus, when the card 13 is returned to the card feed-side card port 76 from the display change device 3, the card 13 runs inside the card passage 70 in the returning direction (direction of an arrow R in FIG. 9) and then reaches the head side card port 60.

Upon returning to the head side card port 60, the card 13 becomes sandwiched between the roller 58 of the head part 21 and the side surface 11 or the side surface 12 of the tray 10. At this point, as described above, the roller 58 of the head part 21 rotates the card 13 in the direction opposite to the rotation direction at the time of removing the card 13 from the fitting part 14, as shown by an arrow S in FIG. 9.

Thus, the card 13 is inserted in the fitting part 14 through the insertion port 14*b* by the roller 58, as shown by an arrow s. Upon confirmation that the card 13 is inserted in the fitting part 14, the controller rotates the eccentric cam 112 in the opposite direction (direction of an arrow Z in FIG. 9) until the eccentric portion 115 is detected by the sensor 118. As a result, the display change device 1 is pulled by a spring 64, and turns about the support shaft 26 in the direction separating from the tray 10 (direction of an arrow C in FIG. 9) to restore its original posture. As a result, the display change device 1 completes a series of operation, and stands by for installing and removing operation and display change operation on the card 13 to be performed for the next tray 10.

As described above, the display change device 1 of the present embodiment is configured so that the eccentric cam 112 is turned to strike and move the main body part 25 and then so that, when the main body part 25 makes surface contact with the side surface 11 or the side surface 12 of the tray 10 to thereby become unturnable, the eccentric cam 112 moves, together with the moving part 102, far from the pressure reception wall 23*e*. Thus, the display change device 1 of the present embodiment, even with the tray 10 deviating more or less from a predetermined standard, can reliably make the head part 21 contact the side surface 11 or the side surface 12 and can install and remove the card 13 fitted to the fitting part 14. More specifically, the display change device 1 turns the eccentric cam 112 by the time the eccentric portion 115 comes to contact the pressure reception wall 23*e*, and can install and remove the card 13 to and from the fitting part 14 when the side surface 11 or the side surface 12 of the tray 10 arrives at within the area at the display change device 1 side from the position at which the head part 21 arrives when the main body part 25 is turned.

As described above, in the display change device 1, when the head part 21 comes into contact with the side surface 11 or the side surface 12 of the tray 10, the eccentric cam 112 moves far from the pressure reception wall 23*e* together with the moving part 102 under the condition that the eccentric cam 112 presses the pressure reception wall 23*e* of the main body part 25. Thus, regardless of difference in size or shape among trays 10, the head part 21 can press the side surface 11 or 12 of the tray 10 and the card 13 with a pressing force adequate for installing and removing the card 13, without pressing them excessively or insufficiently. Therefore, the display change device 1 is almost free from problems such as slip of the roller 58 of the head part 21 on the card 13, excessive wear or flaw of the card 13 or the roller 58, and the like.

The display change device 1 has the installation/removal device 2 for installing and removing the card 13 and the card display change device 3 for changing the display on the card 13 that are integrated together, and is capable of smoothly performing a series of operation. Moreover, the display change device 1 adopts a so-called rewrite card as the card 13, and thus can repeatedly use the card 13 over several hundreds of times. Further, according to the display change device 1 of the present embodiment, the wear or the flaw of the card 13 can be prevented, thereby permitting use of the card 13 as long as change of display is permitted. Thus, the display change device 1 of the present embodiment requires low running costs and can control the amount of waste substance to the minimum, compared to when a disposable card is adopted.

In the embodiment described above, the example in which a rewrite card is adopted as the card 13 is provided, but the present invention is not limited to this, and thus can be provided with configuration adopting, for example, a card incapable of display. More specifically, the display change device 1 may be configured so that the card display change device 3 is connected to, instead of the installation/removal device 2, for example, discard means for discarding a disposable card removed from the tray 10 by the installation/removal device 2, card supply means for supplying a card, card recording means for marking predetermined information on a card supplied from this feeder, or the like. With such a configuration, although the card cannot be recycled, the card on which predetermined information is marked can be smoothly and appropriately installed and removed to and from the tray 10.

The display change device 1 described above feeds the card 13 removed by the card installation/removal device 2 to the card rewriting device 3, returns it to the card installation/removal device 2 after display information is rewritten, and then returns it to the fitting part 14 of the tray 10. However, the present invention is limited to this, and thus may be configured as a display change device 150 shown in FIG. 11.

To describe it more specifically, the display change device 150 has a main body part 151 and a position adjustment mechanism part 100 that have the same framing structure as that of the card installation/removal device 2 of the display change device 1 described above or that are formed in an appropriate shape such as a box shape or the like. The display change device 150 is so disposed as to be oriented along the conveyor device 15*a*. The display change device 150, as is the case with the display change device 1, is so supported as to be able to approach and separate from the conveyor device 15*a* with a center located at a support shaft 26. The display change device 150 is configured so that, instead of connecting and integrating the card rewriting device 3 as achieved by the display change device 1, a display change head part 152 is provided at a position corresponding to the head part 21 as hatched in FIG. 11. The display change head part 152 is, like the one stored in the card rewriting device 3, capable of rewriting display information on the card 13.

With the display change device 150, when the tray 10 fitted with the card 13, on which display is to be changed, arrives at a position adjacent to the main body part 151, the position adjustment mechanism part 100 operates in the same manner as the display change device 1, so that the display change head part 152 is pressed against the recording surface of the card 13 fitted to the side surface 11 or the side surface 12 of the tray 10.

More specifically, when the tray 10 arrives at the position adjacent to the main body part 151, a controller (not shown) of the display change device 150 stops the conveyor device 15*a* and also activates a motor 113 of the position adjustment mechanism part 100 to turn an eccentric cam 112, as shown by an arrow A in FIG. 12A. As a result, the main body part 151 is struck and moved by the eccentric cam 112, and the display change head part 152 is brought to hit the card 13, as in FIG. 12A. Subsequently, further rotation of the eccentric cam 112 causes in a reaction force Fr acting on the eccentric cam 112 from the main body part 151 side to become larger than a force Fa for drawing the eccentric cam 112 toward the main body part 151 side by the spring 64. As a result, the eccentric cam 112 escapes in the direction separating from the main body part 151 as in FIG. 12B. As a result, the display change head part 152 of the main body part 151 is brought to hit against the card 13 with an adequate pressing force.

When the eccentric portion of the eccentric cam 112 comes to be closest to the main body part 151 as in FIG. 12B, the control means stops power distribution to the motor 113. Subsequently, the control means activates the conveyor device 15*a* and moves the tray 10 relative to the display change head part 152, as shown by an arrow B in FIG. 12C. The control means transfers the tray 10 in the direction of the arrow C opposite to the arrow B as appropriate. That is, the control means transfers the tray 10 relative to the display change head part 152 in accordance with printing capability or the like of the display change head part 152, and, if necessary, reciprocates the tray 10 along the display change head part 152. As a result, the display information on the card 13 is sequentially rewritten by the display change head part 152.

Upon completion of rewriting on the card 13, as shown by an arrow Z in FIG. 12C, the control means oppositely rotates the eccentric cam 112 to separate the main body part 151 and the display change head part 152 from the tray 10. As a result, a series of operation performed by the display change device 150 for changing the display information on the card 13 is completed.

The display change device 150 described above is provided, at the position corresponding to the head part 21 of the display change device 1, with the display change head part 152 having a capability corresponding to that of the card rewriting device 3, thus resulting in more compact configuration than the display change device 1. In addition, the display change device 150 is capable of changing the display on the card 13 without involving operation of installing and removing the card 13, operation of feeding and returning the card 13, and the like, thus permitting smoothly and quickly changing the display information.

Moreover, the display change device 150 described above includes the same position adjustment mechanism part 100 as that of the display change device 1; therefore, even when the trays 10 that are more or less variable in size, shape, or the like with respect to the predetermined standard is supplied, the display change head part 152 can be brought to hit against the card 13 fitted to the tray 10 with an adequate pressing force. Thus, the display change device 150 is free from failure in changing the display information, such as contact failure between the display change head part 152 and the card 13, printing failure or erasing failure caused by bringing the display change head part 152 to excessively strongly hit against the card 13.

The display change device s 1 and 150 described above change display information by bringing a display change device (not shown) built in the card rewriting device 3 and the display change head part 152, respectively, into close contact with each other. However, the present invention is not limited to this and thus may be configured as, for example, a display change device 170 shown in FIG. 13.

To describe it more specifically, the display change device 170 has structure almost the same as that of the display change device 150 described above but different therefrom in that, instead of the display change head part 152, an information communication device 171 (reader-writer) is fitted. When the display change device 170 is adopted, a card 172 as shown in FIG. 13, instead of the card 13 described above, is adopted.

The information communication device 171 is a device capable of transmitting predetermined information to be displayed on the card 172 or data of composite information including this information. The card 172 has a data processing part 173 and a display part 175 as shown in FIG. 13A. The card 172 is capable of data transmission and reception between the data processing part 173 and the information communication device 171 while not in contact therebetween, and is capable of displaying on the display part 175 part or all of information consequently cumulated in the data processing part 173.

To describe it more specifically, the data processing part 173 is composed of the one referred to as a so-called radio frequency identification (RFID) tag or the like. The data processing part 173 is so configured as to include communication means, such as an antenna part 173*a* or the like, for data transmission with the information communication device 171 and storage means, such as an IC (integrated circuit) chip 173*b*, and so configured as to further include data processing means, such as a microprocessor, radio wave rectification means, and the like as appropriate.

When the antenna part 173*a* receives a radio wave from the information communication device 171, the data processing part 173 generates an electromotive force under the action of resonance such as electromagnetic induction or the like. This electromotive force activates the IC chip 173*b*, whereby data transmitted from the information communication device 171 side is stored. In addition, at this point, the data stored on the IC chip 173*b* is transmitted to the information communication device 171 side as appropriate. That is, the data processing part 173 is capable of performing data transmission and reception by utilizing the electromotive force generated by the radio wave transmitted from the information communication device 171.

The data processing part 173 is capable of storing, on an IC chip 174, individual data concerning, for example, the type and amount of drugs stored in the tray 10, the dispensed date and the patient dosed with these drugs. Here, examples of the individual data to be stored on the IC chip 174 include those appropriately selected by the user of a dosing system 5 from among various data, such as the name, sex, age, ward, hospital room number, address, phone number, ID number, insurance card number, dosing history, medical history, disease state, height, weight, prescription, injection prescription, comments from a doctor or a pharmacist, precautions at the time of dosing and the like of a patient assigned to the tray 10 fitted with the card 172.

The display part 175 is composed of a display device referred to as a so called cholesteric liquid crystal or an electronic paper. The display part 175 is electrically connected to the data processing part 173, and is capable of displaying part or all of data stored on the IC chip 174. The display part 175 requires electric power upon writing or erasing of information to be displayed on the display surface. However, once the information is displayed on the display surface, the display part 175 is capable of continuously displaying the information even without being supplied with an electric power. Thus, the display part 175 can utilize, for example, an electromotive force generated by electromagnetic induction or the like upon data processing with the information communication device 171 to perform the writing and erasing of the display information displayed on the display surface.

As shown in FIG. 13B, by transmitting a radio wave to the data processing part 173 from an information communication terminal 180 prepared separately from the information communication device 171, the card 172 is capable of data transmission and reception, update of data stored on the IC chip 173*b* of the data processing part 173, update of display information at the display part 175, and the like. As the information communication terminal 180, for example, a PDA (Personal Digital Assistants) or an information management unit can be adopted. Thus, for example, if the doctor, a nurse, or the like brings the information communication terminal 180, such as the PDA or the like, with him or her, this information communication terminal 180 can be used to perform data transmission and reception to and from the data processing part 173 of the card 172 fitted to the tray 10, thereby achieving data processing including reading prescription of drugs stored in the tray 10 or injection prescription that are stored on the IC chip 173*b*, writing prescription history of drugs and the like onto the IC chip 173*b*, and the like. Therefore, by displaying on the display part 175 the information stored in the IC chip 174, the card 172 has, in addition to a function as a label indicating information on drug stored in the tray 10 and the patient to receive the drugs, a function as an information storage medium.

As described above, adopting a data management system for performing data transmission, reception, and update by use of the card 172 and the information communication device 180 can eliminate a paper medium such as prescription or injection prescription that has been needed in the prior art. Moreover, the configuration described above permits eliminating a paper medium and providing no printer for printing operation. Thus, adopting the data management system described above can simplify the configuration of a device that adopts the display change device 170 and can also suppress the running costs.

Moreover, using the paper mediums such as prescription, injection prescription, or the like described above together with the data management system constructed by combining together the card 172 and the information communication device 180 permits more reliably suppressing occurrence of mistakes such as erroneous drug prescription and the like. In a case where a data management system as described above is constructed, it is desirable that individual information and the like held by the card 172 be provided with sufficient security. Thus, it is desirable, for example, to provide configuration such that input of a password be prompted upon reading or writing of information on important prescription, injection prescription, or the like in particular, and configuration such that biometrics system or the like is used to identify an operator.

Here, in a case where privacy and individual information is required to be sufficiently protected, such as a case where there is a patient whose hospitalization is desired to be hidden, it is desirable that information displayed on the display part 175 of the card 172 and information stored on the IC chip 173*b* be erased at a point where they are no longer wanted. Thus, based on this knowledge, in the case of combined use of the card 172 and the information communication device 180 as described above, the information displayed on the display part 175 of the card 172 and part or all of information stored on the IC chip 173*b* may be configured to be erasable as appropriate. More specifically, it may be configured so that, at a point where the information displayed on the display part 175 and the information stored on the IC chip 173*b* are no longer wanted, for example, after completion of dosing, these information are erased by transmitting a radio wave or a signal from the information communication terminal 180 such as a PDA or the like. With such a configuration, sufficient consideration can be given to the protection of privacy and individual information of a patient.

As described above, the information communication device 171 is capable of data exchange with the card 172 while not in contact therewith. The information communication device 171 is capable of reliably transmitting predetermined data to the card 172 fitted to the tray 10 that has arrived at a position adjacent to the display change device 170, while its output is suppressed so as to prevent erroneous data transmission to the cards 172 fitted to different trays 10 and data appropriation therefrom and also so as to be prevented from becoming a radio wave that interferes operation of other appliances installed in a hospitals or the like. Thus, in order to change display information on the card 172 into information based on data transmitted from the information communication device 171, it is required to bring the information communication device 171 and the card 172 to approach each other.

Accordingly, as is the case with the display change devices 1 and 150 described above, the display change device 170 is configured such that, when the tray 10 arrives at the position adjacent thereto, the display change device 170 actuates the position adjustment mechanism part 100 and transmits predetermined data from the information communication device 171 with the information communication device 171 and the card 172 approaching each other to thereby change the display information on the card 172.

The display change device 170 described above is configured to change the display information on the card 172 through data transmission and reception between the information communication device 171 and the card 172, and thus can more smoothly and quickly change the display information than the display change devices 1 and 150.

Moreover, in the display change device 170 described above, the information communication device 171 and the card 172 need to be brought to approach each other at the time of changing the display information on the card 172, but the information communication device 171 and the card 172 need not to be brought into close contact with each other, which is required in the display change devices 1 and 150 described above. Thus, the display change device 170 can more widely support variations in size and shape of the tray 10.

Since the information communication device 171 and the card 172 need not to be brought into close contact with each other, the display change device 170 may be configured so that some space is formed between the information communication device 171 and the card 172 when the tray 10 having a size and a shape as specified is supplied and then the eccentric portion 115 of the eccentric cam 112 comes to approach closest to the main body part 151. With this configuration, breakage of and damage to the information communication device 171 and the card 172 can be suppressed to a minimum.

The display change device 170 described above is so configured as to be tilted toward the card 172 side fitted to the tray 10 in view of improving in the accuracy of data transmission and reception between the information communication device 171 and the card 172, security problems, and the like. However, the display change device 170 may be so configured as to actuate the position adjustment mechanism part 100, for example, only when the accuracy of data transmission and reception between the information communication device 171 and the card 172 is insufficient or only when high accuracy of transmission and reception is required. Moreover, when challenges to the accuracy of data transmission and reception between the information communication device 171 and the card 172, security challenges, and the like can be resolved, the display change device 170 may be so configured as not to be tilted, that is, the display change device 170 may be fixed to another member such as a frame or the like without providing the adjusting mechanism part 100, as in FIG. 13C.

As described above, to the side surface of the tray 10 as a conveyed object, the card 172 is fitted which is capable of receiving predetermined information or predetermined data including this information and then displaying part or all of this data. The display change device 170 is provided with the information communication device 171 as display changing means capable of transmitting predetermined information or predetermined data including this information to the card 172 fitted to a fitting part provided on a side surface of the conveyed object. Thus, with the display change device 170, display information displayed on the display part 175 of the card 172 can be rewritten without bringing the information communication device 171 and the card 172 into contact with each other.

Moreover, as described above, the card 172 has: the data processing part 173 provided with communication means (an antenna part 173*a*) and storage means (the IC chip 173*b*) for data communication with the information communication device 171; and the display part 175 that displays part or all of data supplied via this data processing part 173. With this configuration, necessary information can be stored into the IC chip 173*b* as the storage means of the data processing part 173, and also all or part of information stored in the IC chip 173*b* can be displayed on the display part 175. That is, with the configuration described above, the card 172 can be utilized as a label for the tray 10 and also as storage means for storing various data.

With the configuration described above, it is desirable that the data processing part 173 be provided with a RFID tag. According to this configuration, the card 172 can be downsized and also can be so configured to be excellent in the accuracy of data transmission and reception.

Moreover, as described above, it is desirable that the display change device 170 actuate the data processing part 173 by use of an electric power generated under the action of resonance during data exchange between the information communication device 171 and resonance means for data communication (the antenna part 173 *a*). Further, it is desirable that the card 172 update data on the display part 175 by use of the electric power generated under the action of resonance described above. Adopting this configuration eliminates the need for separately providing a power source for updating data stored in the data processing part 173 and display displayed on the display part 175.

As described above, it is desirable that the display part 175 have a display surface thereof composed of a cholesteric liquid crystal. This composition eliminates the need for supplying an electric power to the card 172 to maintain display of information on the display part 175, thus suppressing the power consumption compared to, for example, a case where a conventionally known nematic liquid crystal is used as the display part 175.

EXAMPLE

Next, the configuration of the display change device 1 shown in the present embodiment described above will be described further in detail, and an example of the dosing system provided with the display change device 1 will be described in detail referring to the drawings. In the description below, portions overlapping with those of the embodiment described above are provided with the same reference numerals and thus are omitted from the detailed descry ption.

In FIG. 14, a reference numeral 1 denotes the display change device 1. In the dosing system 5 of the present embodiment, the display change device 1 is installed in a tray discharger 8 as shown in FIG. 14. The dosing system has a tray supply device 6, a drug dispensing device 7, and the tray discharger 8 as in FIG. 15. The dosing system 5 is a system preferably usable for prescription of drugs and medical materials (hereinafter simply referred to as drugs) referred to as "regular prescription" and prescription of drugs referred to as "temporary prescription", both of which are provided by a hospital or the like. Here, the regular prescription refers to prescription provided for dosing previously specified drugs to a person to be dosed (recipient), such as a hospitalized patient. The regular prescription is a method in which, for example, drugs appropriate for respective recipients are stored into the respective trays 10 specified for the respective recipients at a previously specified time, such as the night one day before a scheduled drug prescription date, and also the trays 10 are classified into placement racks or the like specified for respective predetermined blocks such as wards, and then dosing is performed for each wards (block). The temporary prescription refers to prescription for a patient (recipient) whose prescription details needs to be changed due to, for example, sudden change in his or her condition or the like. In the temporary prescription, drugs are prescribed for respective patients on the dates of dosing in many cases.

The tray supply device 6 is a device that dispenses the tray 10 storing drugs toward a conveyance path 9 provided at a position adjacent thereto. The trays 10 are assigned to respective recipients to be dosed for the regular prescription or the temporary prescription described above. The tray 10 has fitted on the fitting part 14 on either one of the side surfaces 11 and 12 the card 13 including written information in an appropriate form, such as a character, a symbol, a bar code, and the like, including information on the drugs and the recipient thereof. As described above, marked on the card 13 are: for a patient assigned to the tray 10, the ward name 13*a*, the room name 13*b*, the dosing date 13*c*, the patient's name 13*d*, the hiragana characters 13*e*, the ID number 13*f*, the card 13 rewriting frequency 13*g*, and the like. Thus, referring to the card 13 permits identification of the patient assigned to the tray 10. Moreover, referring to the rewriting frequency 13*g* permits easily checking whether or not the card 13 has reached the serviceable limit. Further, reading in the bar code 13*h* with a specific reader or the like permits reading out, via the bar code 13*h*, appropriate data concerning the patient assigned to the tray 10, including the sex, age, address, phone number, insurance card number, dosing history, medical history, disease state, height, weight, prescription, injection prescription, comments from the doctor or the pharmacist, precautions at the time of dosing, and the like.

The tray 10 is collected with the card 13 kept fitted thereto and returned to the tray supply device 6 after completion of prescription. If the card 13 fitted to the collected tray 10 has already reached the serviceable limit or if a new tray 10 is to be used, a new card 13 with no written information is inserted into the fitting part 14 on either one of the side surfaces 11 and 12 and then set at the tray supply device 6.

The tray 10 dispensed from the tray supply device 6 is transferred to the conveyance path 9 disposed at a position adjacent to the tray supply device 6 and moves toward the drug dispensing device 7. Here, the conveyance path 9 is composed of a conveyor device conventionally known, such as a belt conveyor, a roller conveyor, or the like, and forms a line of a flow path connecting from the position adjacent to the tray supply device 6 to the tray discharger 8 disposed at the most downstream side in the flow direction of the tray 10 in the dosing system 5.

The drug dispensing device 7 is a device that dispenses a predetermined amount of predetermined drugs to the tray 10 supplied from the tray supply device 6 side based on the directions such as prescription or the like corresponding to a recipient of the drugs assigned to this tray 10. The tray 10 is conveyed on a conveyor composing the conveyance path 9 toward the tray discharger 8 after the predetermined drugs are stored into the drug dispensing device 7.

Here, as described above, the trays 10 are collected after the previous dosing, laid one on another in an appropriate order or otherwise, and then are set at the tray supply device 6. Thus, when the tray 10 is supplied to the drug dispensing device 7, information written on the card 13 fitted to the tray 10 is information concerning a recipient dosed in the past (at previous dosing) by use of this tray 10 and the drugs received by this recipient, and thus is different from information concerning the drugs currently stored in this tray 10 and the recipient expected to receive these drugs. Thus, after completion of dispensing the drugs in the drug dispensing device 7, information marked on the card 13 fitted to the side surface 11 or the side surface 12 of the tray 10 needs to be rewritten without fail.

Accordingly, the dosing system 5 is configured so that the tray discharger 8 disposed downstream of the drugs dispensing device 7 is fitted with the display change device 1, by which display information marked on the card 13 is changed.

To describe it more specifically, the tray discharger 8 is a device which is disposed at the most downstream side in the dosing system 5 and also a device which, by the display change device 1, extracts and rewrites the card 13 fitted to the fitting part 14 of the tray 10, returns it to the fitting part 14 and then transfers this tray 10 to the placement rack 54 disposed at the front. The tray discharger 8 is configured, as shown FIG. 15, to be provided with: the conveyor device 15*a* that conveys the tray 10 transferred from the conveyance path 9; a handling device 15*b* (transfer device) for grabbing the tray 10 located on the conveyor device 15*a* and transferring it to the placement rack 54; and also the display change device 1 for installing and removing the card 13 conveyed by the conveyor device 15*a* and fitted to the tray 10 and also for changing display on the card 13.

The display change device 1 is a device that temporarily removes the card 13 fitted to the fitting part 14 on the side surface 11 or the side surface 12 of the tray 10, rewrites information marked on the card 13, and then returns the card 13 to the fitting part 14. As shown in the embodiment described above, the display change device 1 has the installation/removal device 2 and the display change device 3 that are coupled together, and is stored inside the box-shaped case 20. The card installing and removing unit 1 is postured with the head part 21 side of the installation/removal device 2 facing the conveyor device 15*a* side, and is fitted to the lower end portion of the tray discharger 8.

As described above, the installation/removal device 2 is so supported as to be turnable, within a predetermined operation range, about the support shaft 26 provided at the region located at the boundary edge 25*c* side (on the left side in FIG. 16) plus at the back 25*b* side of the main body part 25. The main body part 25 has the frame plates 23*a* and 23*b* of metal respectively arranged at the top and the bottom thereof, and has an outer shape thereof formed by fixing the support plate 23*c*, the support shaft 23*d*, the pressure reception wall 23*e*, and the support plate 23*f* in such a manner as to bridge between the frame plates 23*a* and 23*b*.

The installation/removal device 2 is so supported as to be freely turnable in the directions approaching and separating from the conveyor device 15*a* via the support shaft 26 vertically extending and provided at the region located at the boundary edge 25*c* side of the main body part 25, that is, on the left side in the state shown in FIG. 16 plus at the back 25*b* side of the main body part 25. That is, the display change device 1 can turn about the support shaft 26 in the directions approaching and separating from the conveyor device 15*a* and also the side surface 11 or the side surface 12 of the tray 10 conveyed by the conveyor device 15*a*.

The support plate 23*c* is a metal plate so fixed as to bridge between the support plates at a position corresponding to the boundary edge 25*c* side, that is, frame plates 23*a* and 23*b* near the boundary with of the display change device 3 plus at a position located at the front 25*a* side of the main body part 25, when the installation/removal device 2 is installed as shown in FIG. 17. The support plate 23*c* is a member that couples the frame plates 23*a* and 23*b* together, and has fitted at the middle portion thereof, that is, a region between the support plates 23*a* and 23*b* a write side sensor 27 for detecting the card 13 running inside the installation/removal device 2. The support shaft 23*d* is a shaft body of metal disposed at a position adjacent to support plate 23*a* and is a member, like the support plate 23*c*, that couples the frame plates 23*a* and 23*b* together.

The pressure reception wall 23*e* is fixed at a position corresponding to the terminal edge 25*d* side plus at a region located at the back 25*b* side, when the installation/removal device 2 is installed as shown in FIG. 18, and forms a wall surface vertically arranged between the frame plates 23*a* and 23*b*. As described in the embodiment above, the pressure reception wall 23*e* is a portion where is pressed by being contacted by the outer peripheral portion of the eccentric cam 112 of the position adjustment mechanism part 100 disposed at the back 25*b* side of the main body part 25.

The pressure reception wall 23*e* has a notch 30 located at the frame plate 23*a* side. At the position corresponding to the notch 30, a head-side card position detection sensor 28 for detecting the card 13 passing through the head part 21 is so fitted as to be exposed to the notch 30.

At the rear surface side 25*d* side of the pressure reception wall 23*e*, an actuator 29 (gap adjusting means) is fitted. The actuator 29 has a telescopic shaft 29*a* that expands and contracts by changing the power distribution state. The telescopic shaft 29*a* is disposed at a position upper than the frame plate 23*a*, with the leading end thereof pinned with one end side of a coupling rod 29*b* so disposed as to extend across the frame plate 23*a*. The other side of the coupling rod 29*b* is coupled to a top surface part 37 of a frame member 35, to be described later, that composes head part 21.

To the side surface at the boundary edge 25*c* side of the pressure reception wall 23*e*, as shown in FIGS. 16 and 17, a hook-like member 34 is fitted which is formed of metal. The hook-like member 34 functions as an contacting stop for preventing turning of the frame member 35, to be described later, of the head part 21 with respect to the main body part 25 at an angle over a predetermined angle.

The support plate 23*f* is a metal plate disposed substantially in parallel with the pressure reception wall 23*e* and so fixed as to bridge across between the frame plates 23*a* and 23*b* as shown in FIG. 16. The support plate 23*f* has: a top surface part 31 and a bottom surface part 32 that project toward the front 25*a* side along the frame plates 23*a* and 23*b* when fixed to the frame plates 23a and 23b; and a side surface part 33 that projects toward the front 25a side between the frame plates 23a and 23b and that extends vertically. The side surface part 33 is provided with base parts 33a and 33b. The base part 33a is fitted with an end portion of a spring 42 which is fitted to the frame member 35, to be described later, of the head part 21 and which biases the head part 21 toward the main body part 25 side. Moreover, the base part 33a is fitted with a card presence detection sensor 49. The base part 33b is fitted with the spring 64 which connects together the seat member 101 of the position adjustment mechanism part 100 to be described later and the main body part 25 and which biases the main body part 25 toward the position adjustment mechanism part 100 side.

The drive part 24 has, as a power source, the motor 18 fitted to the substantially central portion in the extending direction of the main body part 25, and transmits a torque to the head part 21 side and the card feed part 22 side via an relay shaft 19 disposed at a position adjacent to the motor 18.

The motor 18 has an output shaft 18a thereof so fitted as to project upward from the frame plate 23a. To the leading end of the output shaft 18a, an output gear 18b is fixed. The relay shaft 19 is a shaft body disposed in parallel with the output shaft 18a, and is so fitted as to be rotatable relative to both the frame plates 23a and 23b. The relay shaft 19 projects from the both frame plates 23a and 23b. To the lower end portion of the relay shaft 19, that is, to the region of the relay shaft 19 projecting downward from the frame plate 23b, a head-side relay gear 19a of metal is fixed. To the upper end portion of the relay shaft 19, that is, to the region of the relay shaft 19 projecting upward from the frame plate 23a, a feed-side relay gear 19b of resin is fixed which has a diameter larger than that of the head-side relay gear 19a. The head-side relay gear 19a and the feed-side relay gear 19b are so configured as to be respectively connected to an input-side gear 46 of the head part 21 and a driven gear 81a at the card feed part 22 side, both to be described later, so that a torque of the motor 18 can be transmitted to the head part 21 side and the card feed part 22 side.

The head part 21 forms a main part of an installing and removing mechanism for installing and removing the card 13 to and from the fitting part 14 provided on the side surfaces 11 and 12 of the tray 10. The head part 21 slides the card 13 by turning the output shaft 45, to be described later, with the roller 58 fitted to the output shaft 45 in close contact with the surface of the card 13.

To describe it more specifically, as shown in FIG. 19, the head part 21 is so structured as to have the frame member 35 of metal fitted with the input shaft 43 and the output shaft 45. As shown in FIG. 17, the input shaft 43 is so fitted as to penetrate through the frame member 35 to be freely rotatable with respect to the support plates 23a and 23b. The frame member 35 is cantilever-supported with respect to the main body part 25 by the input shaft 43, and can tilt its posture within a predetermined range by turning about the input shaft 43. As shown in FIG. 19, the frame member 35 is so formed as to have a back plate part 36 and an area whose three sides is surrounded by a top surface part 37, a bottom surface part 38, and a side surface part 39 bending toward the front 25a side perpendicularly to this back plate part 36 and whose remaining one side is open. The hook-like member 34 described above has a portion thereof bent in a hooked manner which portion is hooked at the open portion described above when the head part 21 tilts with respect to the main body part 25 over the predetermined angle. Thus, the frame member 35 of the head part 21 can tilt with respect to the main body part 25 up to such an angle that permits the open portion of the frame member 35 to be hooked at the hook-like member 34.

To the side surface part 39, a spring fitting part 39b is provided which projects outward from the area surrounded by the top surface part 37, the bottom surface part 38 and the side surface part 39. The spring fitting part 39b is a region provided for fitting the spring 42 for pulling the end portion of the head part 21 at the input shaft 43 side toward the back 25b side to thereby maintain the posture of the head part 21, as shown in FIG. 16.

The frame member 35 has a projection 40 formed in a block shape which projects toward the front 25a side at a position closer to the boundary side 25c of the back plate part 36 plus at a position corresponding to the middle between the frame plates 23a and 23b. The top surface part 37 and the bottom surface part 38 have a portion thereof located closer to the boundary side 25c plus corresponding to the front 25a side which portion is notched in a rectangular shape part when the head part 21 is fitted to the main body part 25. This rectangular notch region is provided for fitting a base 44 for the output shaft 45 to be described later.

The frame member 35 has at the back plate part 36 a notch part 41, which is provided at a position corresponding to the notch 30 of the pressure reception wall 23e when the frame member 35 is fitted to the main body part 25. Thus, the installation/removal device 2 is configured so that the card 13 passing through the head part 21 can be detected by the head-side card position detection sensor 28.

The frame member 35 is fitted, as shown in FIGS. 16 and 17, in a posture with the back plate part 36 opposing the pressure reception wall 23e when observed from the front 25a side. Moreover, the frame member 35 is fitted in a posture with the top surface part 37 facing the frame plate 23a side and with the bottom surface part 38 facing the support plate 23b. Further, the frame member 35 is pivotably supported by the input shaft 43 so that the spring fitting part 39b sticks outward from the end portion of a terminal end side 25d of frame plates 23a and 23b.

At a position on the top surface part 37 of the frame member 35 plus near the output shaft 45, the leading end portion of the coupling rod 29b connected to the telescopic shaft 29a of the actuator 29 is pinned, as shown in FIG. 16. As described above, the frame member 35 is freely turnably and pivotably supported via the input shaft 43 disposed at a position at the side surface part 39 side of the frame member 35. Thus, when the telescopic shaft 29a of the actuator 29 is expanded and contracted, the head part 21 turns about the input shaft 43, whereby a region at the output shaft 45 side approaches and separates from the support plate 23c. That is, the head part 21 changes the tilt of the frame member 35 with respect to the main body part 25 with the input shaft 43 side referenced as a center following operation of the actuator 29, and changes its tilt within the range from a posture in which the back plate part 36 of the frame member 35 hits the pressure reception wall 23e to a posture in which the back plate part 36 of the frame member 35 hits the hook-like member 34 bent at the front of the frame member 35. Thus, the rollers 58 and 58 fitted to the output shaft 45 becomes slightly projected or withdrawn from the end portions of the frame plates 23a and 23b at the front 25a side.

The input shaft 43 extends vertically in a posture shown in FIG. 17, with the lower end portion thereof penetrating through the support plate 23b located at the lower side to thereby project downward. At a region of the input shaft 43 projecting downward from the frame plate 23b, the input-side gear 46 is so fitted as not to be rotatable relative to the input shaft 43. The input-side gear 46 is a gear of metal having substantially the same size as that of the head-side relay gear 19*a* of the relay shaft 19 described above. The input-side gear 46 is connected to the head-side relay gear 19*a* via a toothed belt 59. The toothed belt 59 has tension thereof adjusted by a tension roller 63 disposed at the middle between the input-side gear 46 and the head-side relay gear 19*a*. Thus, when the motor 18 is activated, the power thereof is transmitted to the relay gear 19 and the input shaft 43 via the toothed belt 59 whereby the input shaft 43 turns.

At the middle portion of the input shaft 43, that is, a position corresponding to the support plates 23*a* and 23*b* when the head part 21 is fitted to the main body part 25, an relay gear 47 of metal having substantially the same diameter as that of the relay gear 19*a* is fitted so as not to be rotatable relative to the input shaft 43.

The output shaft 45 is swingably fitted the back plate part 36 of the frame member 35 via the base 44. Even more specifically, as shown in FIG. 19, the base 44 is formed by bending the metal plate and is composed of a base body 48 where the output shaft 45 is fitted and leg parts 50 and 50. The base body 48 is adopted to have substantially the same length (height) as that of the gap between the top surface part 37 and the bottom surface part 38 of the frame member 35 composing the head part 21, and has an outer shape formed in a C shape with an upper end portion 51 and a lower end portion 52 folded back toward the back 25*b* side as shown in FIG. 19. The output shaft 45 is so supported as to be freely rotatable relative to the upper end portion 51 and the lower end portion 52 of the base body 48.

The leg parts 50 and 50 are formed by being folded back at a substantially central portion in the length (height) direction of the base 44 so as to face in the direction opposite to the direction in which the upper end portion 51 and the lower end portion 52 face, that is, toward the back plate part 36 side of the frame member 35. The surfaces forming the leg parts 50 and 50 are positioned substantially orthogonal relative to the surfaces forming the upper end portion 51 and the lower end portion 52. The base 44 is so disposed as to sandwich the projection 40, which is provided at the frame member 35, by the leg parts 50 and 50. The base 44 is pivotably supported at the projection 40 by a swinging shaft 53 extending across the leg parts 50 and 50 and the projection 40. Further, springs 55 and 55 lie between the rear surface side of the base body 48, that is, the surface facing the back plate part 36 side of the frame member 35 and the back plate part 36 plus lie at position adjacently above and below the leg parts 50 and 50. Thus, when an external force acts on the output shaft 45, the base 44 swings about the swinging shaft 53 so as to tilt toward the back plate part 36. Even more specifically, when an external force acts on a position biased to the upper end side of the output shaft 45, the base 44 tilts with the upper end portion thereof approaching the back plate part 36 and with the lower end portion thereof separating from the back plate part 36. When an external force acts on a position biased to the lower end side of the output shaft 45, the base 44 tilts in the opposite direction.

At a substantially central portion of the output shaft 45 in the axial direction thereof, an output-side gear 56 is so fitted as not to be rotatable relative to the output shaft 45. The output-side gear 56 is connected via a toothed belt 57 to the relay gear 47 provided at the middle position of the input shaft 43. The toothed belt 57 has tension thereof adjusted by the tension roller 63 fitted to the frame member 35 at the middle position between the input shaft 43 and the output shaft 45. Moreover, above and below the output-side gear 56, the rollers 58 and 58 of rubber are fitted so as not to be rotatable relative to the output shaft 45. Thus, the roller 58 fitted to the output shaft 45 rotates in conjunction with the rotation of the input shaft 43.

As shown in FIG. 16, the head-side card port 60 is provided at the position adjacent to the head part 21 plus at the position corresponding to the front 25*a* side of the main body part 25. The head-side card port 60 is a slit-like region formed between the guide members 61, 61 formed in a band-like shape and extending toward the boundary side 25*c* and a tray pressing piece 62 (release means). As shown in FIGS. 16 and 17, at the regions corresponding to the head-side card port 60 of the frame plates 23*a* and 23*b*, introducing pieces 65 and 65 are formed. The introducing pieces 65 and 65 are formed by being notched along the extending direction of the guide members 61 and 61 and being so bent as to tilt upward and downward, respectively, whereby the width of the head-side card port 60 is widened. That is, the head-side card port 60 opens slightly more widely than the card passage 70 to be described later in the height direction.

The guide members 61 and 61 are members formed in a band-like shape and so fixed as to project upward or downward from the frame plates 23*a* and 23*b*, and extend from a position adjacent to the head part 21 toward the boundary side 25*c* of the main body part 25. The guide members 61 and 61 are members extending from the region where the head-side card port 60 is formed to the vicinity of the entrance of the card feed part 22, and are curved in a substantially “S” shape. The guide members 61 and 61 are disposed at the upper and lower positions in parallel to each other, and compose part of the card passage 70 formed inside the card feed part 22.

The tray pressing piece 62 is a member with a fitting part 62*a* and a pressing part 62*b* formed by bending a metal plate at a predetermined angle, as shown in FIGS. 16 and 17. The tray pressing piece 62 has a roller exposing port 66 provided near the boundary portion between the fitting part 62*a* and the pressing part 62*b*. To the tray pressing piece 62, an assist roller 67 for guiding the card 13 passing through the head-side card port 60 is so fitted as to be exposed through the roller exposing port 66 to the card passage 70 side. The tray pressing piece 62 is fixed at the front 25*a* side of the frame plates 23*a* and 23*b* so that the boundary portion between the fitting part 62*a* and the pressing part 62*b* is located near the base end portions of the introducing pieces 65 and 65. The tray pressing piece 62 is fitted so that the fitting part 62*a* extends along the edge parts of the support plates 23*a* and 23*b* at the front 25*a* side and so that the pressing part 62*b* tilts in the direction separating from the aforementioned edge parts. The pressing part 62*b* is provided at a position that contacts the projecting part 17 sealing the insertion port 14*b* when the installation/removal device 2 is turned about the support shaft 26 and then the head part 21 is brought to contact the card 13 fitted to the fitting part 14 of the tray 10. Thus, when the installation/removal device 2 is brought into close contact with the side surface 11 and 12 side of the tray 10 for installation and removal of the card 13, the projecting part 17 is pushed inwardly from the outer side of the tray 10 by the pressing part 62*b*, whereby the card 13 becomes capable of being put in and taken out from the fitting part 14 through the insertion port 14*b*.

The card feed part 22 has a main part composed of the slit-like card passage 70 formed by the guide members 61 and 61 and the guide frames 71 and 72, and the card feed mechanism 75 described above, as shown in FIG. 16.

The card passage 70 is a curved, slit-like passage that connects between the head-side card port 60 formed at the front 25*a* side of the main body part 25 plus at the position adjacent to the head part 21 and the feed-side card port 76 provided at the boundary with the card display change device 3. The feed-side card port 76 is a vertically long opening which is slit to such a degree that permit passage of one card 13 and which is formed at the terminal end portion at the boundary edge 25*c* side of the main body part 25 plus at the substantially central portion in the thickness direction of the main body part 25, that is, at the middle portion between the front 25*a* side and the back 25*b* side.

The guide frame 71 is a frame of metal composing the wall surface at the front 25*a* side of the card passage 70, and is so curved as to be formed along the card passage 70. The guide frame 71 is fixed in a posture substantially perpendicular to both the frame plate 23*a* composing the top surface of the main body part 25 and the frame plate 23*b* composing the bottom surface thereof.

In the guide frame 71, the roller-exposing window 77 is formed which permits exposure of the rollers 87 to 89 to be described later. Moreover, at a position adjacent to the feed-side card port 76 side of the roller-exposing window 77, a sensor exposure window 80 is formed. The sensor exposure window 80 is an opening for exposing a sensor 78 fitted to the support plate 23*e* for detecting the card 13 that enters into and exits from the card passage 70.

At position adjacent to the back 25*b* side of the guide frame 71, as shown in FIG. 17, the roller shafts 81 to 83 are arranged which support the rollers 87 to 89. The roller shafts 81 to 83 are respectively so fitted as to be rotatable relative to the frame plates 23*a* and 23*b* and are disposed along the card passage 70 in such a manner as to be spaced from each other with predetermined intervals. The roller shaft 81 has the upper end portion and lower end portion thereof projecting from the frame plates 23*a* and 23*b*, respectively, to which regions the driven gears 81*a* and 81*b* are fitted. The roller shafts 82 and 83 have the lower end portions thereof projecting downward from the support plate 23*b*, to which regions driven gears 82*a* and 83*a* are fitted, as shown in FIGS. 17 and 18.

The driven gear 81 is connected to the feed-side relay gear 19*b* fitted to the upper end portion of the relay shaft 19 disposed at the position adjacent to the motor 18. The driven gear 81*b* and the driven gear 82*a* are connected together via a relay gear 84*a*, and the driven gear 82*a* and the driven gear 83*a* are connected together via a relay gear 84*b*. Thus, when the motor 18 is activated, the power of the motor 18 is transmitted from the feed-side relay gear 19*b* of the relay shaft 19 to the driven gear 81*a*, whereby the roller shaft 81 and the roller 87 fitted thereto turn. In conjunction therewith, the power transmitted to the roller shaft 81*b* is transmitted to the roller shafts 82 and 83 via the driven gears 82*a* and 83*a* and the relay gears 84*a* and 84*b*, whereby the roller shafts 82 and 83 and the rollers 88 and 89 fitted thereto turn. The rollers 87 to 89 are each so fitted as to be exposed to the inside card passage 70; therefore, when the card 13 is introduced inside the card passage 70, power is transmitted from the rollers 87 to 89 to the card 13, whereby the card 13 moves forward inside the card passage 70.

As shown FIG. 18, the guide frame 72 is a frame of metal composing the wall surface at the back 25*b* side of the card passage 70. The guide frame 72 has a passage forming part 72*a* curved in such a shape as to extend along the card passage 70 and the guide frame 71; a top part 72*b* and a bottom portion 72*c* extending from the upper end portion and the lower end portion of the passage forming part 72*a* toward the back 25*b* side along the frame plates 23*a* and 23*b* when the guide frame 72 is fitted to the main body part 25. The guide frame 72 is so supported as to be rotatable relative to the main body part 25 with a shaft body 93 fixed to the frame plates 23*a* and 23*b* serving as a spindle at position adjacent to the motor 18.

To the guide frame 72, the roller shafts 85 and 86 are so fitted as to bridge between a top surface 72*b* and a bottom surface 72*c*. At the middle portion between the roller shafts 85 and 86, the assist rollers 91 and 92 of resin are so fitted as to be freely turnable with respect to the roller shafts 85 and 86. At the passage forming part 72*a*, roller-exposing windows 95*a* and 95*b* for exposing the assist rollers 91 and 92 to the card passage 70 are provided.

The roller shafts 85 and 86 are inserted in shaft holes 85*a* and 85*a* and shaft holes 86*a* and 86*a* provided in the top part 72*b* and the bottom portion 72*c* and are so supported as to be disabled to drop out from these shaft holes 85*a* and 85*a* and shaft holes 86*a* and 86*a*. Elongate holes provided in the top part 72*b* and the bottom portion 72*c* extend from the card passage 70 toward the back 25*b* side when the guide frame 72 is fitted to the main body part 25. The roller shafts 85 and 86 are biased toward the passage forming part 72*a* side (an arrow F1 side in FIG. 20) by biasing springs 94*a* to 94*d* which are fitted at regions of the upper end side and the lower end side of the passage forming part 72*a* in such a manner as to be placed over the roller shafts 85 and 86. Thus, regardless of the condition of the card 13 passing through the inside of the card passage 70, such as the thickness and the like thereof, the assist rollers 91 and 92 can bias the card 13 so that a frictional force generated between the card 13 and the rollers 87 to 89 disposed the front 25*a* side of the card passage 70 becomes adequate for sliding the card 13.

To the guide frame 72, a locking shaft 96 is provided at a position closer to the back 25*b* side (the front side in FIG. 20) than the roller shafts 85 and 86 plus at a position corresponding to the middle between the roller shafts 85 and 86. The locking shaft 96 is inserted through elongate holes 90 and 90 which extend in the longitudinal direction of the guide frame 72 and which are provided at the top part 72*b* and the bottom portion 72*c* of the guide frame 72. The locking shaft 96 projects outwardly from the guide frame 72 and is so supported as to be disabled to drop out from the elongate holes 90 and 90. The locking shaft 96 is biased toward the main body part 25 at the boundary edge 25*c* side by springs 94*e* and 94*f* fitted across the guide frame 72 and the locking shaft 96. To the support plates 23*a* and 23*b*, a locking part 97 in a hook-like shape is provided into which the locking shaft 96 can be locked. The guide frame 72 is fixed to the main body part 25 by locking the locking shaft 96 into the locking part 97, thereby forming the card passage 70 of such a width that permits the passage of the card 13, as shown FIG. 16 and the like.

The display change device 1 is structured so that the card display change device 3 is connected at the position adjacent to the card feed part 22 of the installation/removal device 2 that is structured as described above. The card display change device 3 is a device capable of erasing information, such as character information, graphic information, a bar code, and the like, marked on the display surface of the card 13 composed of what is typically referred to as "rewrite card" and changing display of this information. As the card display change device 3, a writing device for a rewrite card conventionally known can be adopted. The card display change device 3 is connected to the installation/removal device 2 so that a card 13 port (not shown) is located at a position adjacent to the feed-side card port 76 of the card passage 70. Thus, the card display change device 3 can take in the card 13 transmitted from the card passage 70 through the above-mentioned port, can rewrite the display information on the card 13 thereinside, and then can return it from the feed-side card port 76 to the card passage 70 of the installation/removal device 2.

Subsequently, operation preformed by the display change device 1 of this example will be described in detail referring to the accompanying drawings. As described in the embodiment above, the display change device 1 of this example actuates the position adjustment mechanism part 100 and also actuates the actuator 29 to thereby have the head part 21 approach the tray 10 arriving at the position adjacent to the installation/removal device 2 so as to perform installation and removal of the card 13 and change of display thereon.

To describe it more specifically, upon detection, by the card presence detection sensor 49 as shown in FIG. 6A, that the card 13 has arrived at the position adjacent to the head part 21 of the display change device 1, the controller (not shown) of the display change device 1 activates the motor 113 of the position adjustment mechanism part 100 to rotate the eccentric cam 112 in the direction of the arrow A, as described in the embodiment above. As a result, as shown in FIG. 7, the pressure reception wall 23*e* of the main body part 25 is pressed by the contoured portion of the eccentric cam 112 whereby the display change device 1 tilts toward the tray 10 side.

Further rotation of the eccentric cam 112 in the state shown in FIG. 7 further tilts the display change device 1 toward the tray 10 side as shown in FIG. 8, whereby the roller 58 of the head part 21 is brought to be pressed against the card 13 fitted to the side surface 11 or the side surface 12 of the tray 10. At this point, in the head part 21, the base 44 fitted with the output shaft 45 supporting the rollers 58 is swingable about the swinging shaft 53 and is biased by the springs 55 from the rear surface side of the base body 48, as shown in FIG. 19. Thus, when the head part 21 is pressed against the side surface 11 or the side surface 12 of the tray 10, the output shaft 45 tilts together with the base 44 so as to be oriented along the side surface 11 or the side surface 12, whereby the roller 58 comes into firm surface contact with the front surface of the card 13.

Moreover, when the head part 21 comes into surface contact with the side surface 11 or the side surface 12 of the tray 10, the pressing part 62*b* of the tray pressing piece 62 fitted to the front 25*a* side of the main body part 21 hits the projecting part 17 provided on the left side of the fitting part 14 of the tray 10. The projecting part 17 comes to be pressed inwardly from the outer side of the tray 10 by the tray pressing piece 62. Thus, when the head part 21 hits the tray 10, the insertion port 14*b* comes to open, so that, by sliding the card 13 with respect to the side surface 11 or the side surface 12, the card 13 becomes freely installable to and removable from the fitting part 14.

At this point, as described above, the motor 113 continues its operation by the time the sensor 117 detects that the eccentric portion has arrived at the pressure reception wall 23*e* side. Thus, even when the roller 58 of the head part 21 comes to contact the card 13 as in FIG. 8, the motor 113 continues its operation. When the motor 113 continues its operation in the state shown in FIG. 8, the reaction force Fr acting on the eccentric cam 112 side as a result of pressing the pressure reception wall 23*e* by the eccentric cam 112 becomes gradually larger. Then, when this reaction force Fr becomes larger than the tensile force Fa for pulling the moving part 102 fitted with the eccentric cam 112 toward the pressure reception wall 23*e* side become larger than, the eccentric cam 112 escapes together with the moving part 102 in the direction separating from the pressure reception wall 23*e*, as in FIG. 9. As a result, the roller 58 is pressed against the card 13 with an adequate pressing force, whereby the roller 58 and the card 13 come into close surface contact with each other and thus no excessive load is imposed on the card 13 even when the eccentric cam 112 continues its rotation.

As shown in FIG. 9, when the sensor 117 detects that the eccentric portion 115 of the eccentric cam 112 has arrived at the pressure reception wall 23*e* side, the control means stops power distribution to the motor 113 of the position adjustment mechanism part 100 and starts power distribution to the motor 18 at the main body part 25 side. As a result, the power of the motor 18 is transmitted to the head 21 side, whereby the output shaft 45 of the head part 21 and the roller 58 fitted thereto start to rotate.

When the roller 58 rotates, the card 13 in surface contact with the roller 58 slides in the direction along the side surface 11 or the side surface 12 and exits through the insertion port 14*b*. The card 13 exiting through the insertion port 14*b* is fed to the card passage 70 via the head-side card port 60 opening at the position adjacent to the head part 21.

As in FIG. 1, at a point when the card 13 is fed to the card passage 70 side and then a detection signal of the card 13 detected by the card position detection sensor 28, which is provided at the rear surface side of the head part 21, disappears, that is, at a point when the terminal end portion of the card 13 has passed through the position where the card position detection sensor 28 is installed, the control means actuates the actuator 29. As a result, as shown by an arrow X in FIG. 21B, the head part 21 is withdrawn to the main body part 25 side, thereby becoming completely separated from the side surface 11 or the side surface 12 of the tray 10 as in FIG. 21C. Thus, while the card 13 is fed inside the card passage 70, no friction between the roller 58 and the tray 10 is generated, thereby avoiding wear of the roller 58 even when the roller 58 of the head part 21 continues to be rotated by operating the motor 18.

When the card 13 is fed into the card passage 70 as described above, the card 13 is fed to the feed-side port 76 side while receiving power from the rollers 87 to 89 arranged along the card passage 70 and then is fed to the card display change device 3. When the card 13 is fed into the card display change device 3, the control means operates the card display change device 3 to change display of information marked on the card 13.

When the change of the display on the card 13 is completed in the card display change device 3, the card 13 is returned to the feed-side port 76 provided in the main body part 25 of the installation/removal device 2. Simultaneously therewith or at a point when the card 13 is fed into the card display change device 3, the control means switches the state of power distribution to the motor 18 to reverse the rotation of the output shaft 18*a* of the motor 18. As a result, the rollers 87 to 89 of the card feed part 22 and the rollers 58 and 58 of the head part 21 rotate in the direction opposite to the rotation direction when the card 13 is removed from the tray 10. Thus, the card 13 returned from the card display change device 3 runs inside the card passage 70 toward the head part 21 side and projects from the head-side card port 60 outwardly of the main body part 25 as in FIG. 21C.

When the card 13 projects form the head-side card port 60 and is detected by the card position detection sensor 28, the control means stops the power distribution to the actuator 29 and returns the telescopic shaft 29*a* to the original state, that is, to the state in which it is extended to the front 25*a* side. As a result, as in FIG. 21B, the card 13 becomes sandwiched between the rollers 58, 58 of the head part 21 and the side surface 11 or the side surface 12 of the tray 10. As a result, the power of the rollers 58 and 58 is transmitted to the card 13, whereby the card 13 is inserted into the fitting part 14 of the tray 10.

When the card presence detection sensor 49 detects that the card 13 has been stored into the fitting part 14, the control means stops power distribution to the motor 18 provided at the main body part 25. Subsequently, the control means starts power distribution to the motor 113 of the position adjustment mechanism part 100 to rotate the eccentric cam 112 in the direction of the arrow Z in FIG. 9. As a result, the eccentric portion 115 of the eccentric cam 112 gradually moves far from the pressure reception wall 23*e*, whereby the main body part 25 is separated from the tray 10 by the spring 64 fitted to the seat 33*b*.

When the installation and removal of the card 13 and the change of the display thereon are completed as described above, the control means actuates a handling device 15*b* disposed above the conveyor device 15*a*, whereby the tray 10 is transferred from the conveyor device 15*a* to the placement rack 54 disposed in front of the tray discharger 8. As a result, the display change device 1 completes a series of prescription operation performed on the tray 10.

Subsequently, the operation of the dosing system 5 of the present embodiment will be described in detail referring to a flowchart shown in FIG. 23. When the dosing system 5 is activated, the controller of the dosing system 5 waits for an input of prescription order data based on directions from the doctor or the like (step 1). Here, the prescription order data denotes data appropriately selected by the doctor or the like including: the name, sex, age, ward, hospital room number, address, phone number, ID number, insurance card number, dosing history, medical history, disease state, height, weight, prescription, injection prescription, comments from the doctor or the pharmacist, precautions at the time of dosing and the like concerning the patient subjected to prescription.

When the prescription order data is inputted in step 1, the tray 10 is dispensed from the tray supply device 6 to the carrier device 15, and then conveyed downstream by the carrier device 15. On the other hand, the controller operates the drug dispensing device 7 based on previously inputted prescription order data, and prepares drugs. When the preparation of the drugs has been completed in the drug dispensing device 7 and the tray 10 has arrived at the drug dispensing device 7, it becomes ready to introduce the drugs to the tray 10.

When the preparation for introducing the drugs has been completed in the drug dispensing device 7, the drugs is introduced to the tray 10. In conjunction therewith, the control means actuates the drug dispensing device 7 or a printer, not shown, located more downstream thereof, prints data concerning the drugs introduced to the tray 10 including the prescription and injection prescription, comments from the doctor or the pharmacist, precautions at the time of dosing, and the like, and introduces this printed material together with the drugs to the tray 10, whereby the operation of introducing the drugs to the tray 10 is completed (step 2).

When the operation of introducing drugs has been completed in step 2, the tray 10 is fed from the drug dispensing device 7 toward the tray discharger 8. When the tray 10 has arrived at the tray discharger 8, the display change device 1 operates in the procedures described above, so that the card 13 fitted to the side surface 11 or the side surface 12 of the tray 10 is rewritten (step 3). In step 3, when the rewriting of the card 13 has been completed, the handling device 15*b* of the tray discharger 8 operates and then the tray 10 is transferred to the placement rack 54 prepared in front of the tray discharger 8, whereby the operation of dispensing the tray 10 is completed (step 4).

When the loading of the tray 10 to the placement rack 54 has been completed in step 4, the drugs stored in the tray 10 and the printed material stored in the tray 10 as described above are compared with each other in step 5, and a drug audit operation is performed in which it is checked if the drugs are properly dispensed inside the tray 10. Here, the drug audit operation is achieved by one or a plurality of methods appropriately selected from among a check method through visual check by the doctor, the pharmacist, the nurse, or the like, a mechanical method of utilizing a tag, a bar code, and the like added to the drugs, and the like.

When the drugs have not been properly dispensed in step 5, the tray 10 is removed from the placement rack 54 to perform again the operation of dispensing the drugs by the series of controls described above. On the other hand, when the drugs have been properly dispensed in step 5 to the tray 10, the tray 10 is conveyed to the ward or the like while being loaded on the placement rack 54. The tray 10 conveyed by the placement rack 54 is conveyed, based on the card 13 installed thereto, to the doctor or the nurse who is in charge of the patient written on the card 13. The doctor or the nurse dispenses or injects the drugs stored in the tray 10, based on the printed material, such as the prescription, the injection prescription, and the like.

As described above, the display change device 1 adopted in this example turns the main body part 25 by turning the eccentric cam 112 to bring the head part 21 into contact with the card 13 or the tray 10. Then, the display change device 1 is configured so that, under the condition that the reaction force Fr acting as a result of hitting the card 13 or the tray 10 by the head part 21 and pressing the pressure reception wall 23*e* by the eccentric cam 112 becomes larger than the tensile force Fa for pulling the moving part 102 fitted with the eccentric cam 112 toward the pressure reception wall 23*e* side, the eccentric cam 112 moves together with the moving part 102 far from the pressure reception wall 23*e*. Thus, in the present embodiment, even when a mixture of the trays 10 of different sizes and standards is supplied, the rollers 58 and 58 of the head part 21 can be brought into surface contact with the side surfaces 11 and 12 of each tray 10 or the card 13 with an adequate pressing force.

Further, in the display change device 1 of this example, the base 44 supporting the output shaft 45 of the head part 21 is supported swingably. Thus, in the display change device 1, when the head part 21 is brought to hit the card 13 or the tray 10, the output shaft 45 tilts so as to be oriented along the side surfaces 11 and 12 of the tray 10, whereby the outer circumferential surfaces of the rollers 58 and 58 are reliably brought into surface contact with the card 13. Thus, even when the display change device 1 is used under the condition that the trays 10 more or less different in size and shape from one another are mixed together, the roller 58 of the head part 21 can be hit with an adequate pressing force, so that, at the installation and removal of the card 13, the roller 58 does not slip and the roller 58 does not become pressed with an excessive pressing force. Therefore, the card display change device 1 of this example is capable of reliably installing and removing the card 13, hardly resulting in abrasion of the rollers 58 and 58 and the card 13.

The display change device 1 shown in the present embodiments and the examples described above is disposed so that, when installed, the installation/removal device 2 and the card display change device 3 are oriented horizontally. However, the present invention is not limited to this, and thus, for example, as shown in FIG. 22, the display change device 1 may be so configured as to be swingably supported by a shaft body 99 extending longitudinally of the display change device 1. With this configuration, even when the trays 10 whose side surface 11 and 12 are tilted in mutually different manners are sequentially supplied, the entire display change device 1 tilts so as to be oriented along the side surface 11 and 12 of each tray 10, thereby permitting the rollers 58 and 58 to be reliably brought into surface contact with the card 13 or the side surface 11 and 12.

Moreover, the display change device 1 of this example is configured so that the actuator 29 is connected via the coupling rod 29*b* to the frame member 35 composing the head part 21, so that the frame member 35 can be turned about the input shaft 43 by operating the actuator 29, whereby the rollers 58 and 58 of the head part 21 can approach or separate from the side surface 11 and 12 of the tray 10 or the card 13. That is, the display change device 1 can adjust a gap between the rollers 58, 58 and the side surface 11 and 12 or the card 13 in accordance with the operating condition of the actuator 29. Thus, as shown in FIG. 21C, the display change device 1 locates the head part 21 far from the side surfaces 11 and 12 and the card 13 when standing by for the operation of installing and removing the card 13, thereby preventing wear or flaw of the roller 58, the card 13, the tray 10, and the like.

As described above, according to the display change device 1 of this example, the card 13 and the like hardly wear or hardly become broken. Thus, in the dosing system 5 of this example, the card 13*c* can be used as long as the display can be changed. Therefore, according to the dosing system 5 of this example, the frequency of maintenance, such as replacement and the like, of the card 13 suffering from wear or breakage, can be minimized and also the running costs can be held down.

When the display change device 1 of this example has the head part 21 hit the side surfaces 11 and 12 of the tray 10, the pressing part 62*b* of the tray pressing piece 62 fitted at the front 25*a* side of the main body part 25 plus at the position adjacent to the head part 21 pushes the projecting part 17 that is held over the insertion port 14*b* of the tray 10, so that the insertion port 14*b* comes to open. Thus, the display change device 1 can bring the insertion port 14*b* to open by simply bringing the head part 21 into surface contact with the side surfaces 11 and 12 of the tray 10, thereby achieving smooth installation and removal of the card 13.

The display change device 1 shown in any of the embodiments and example described above has the position adjustment mechanism part 100 press the pressure reception wall 23*e* of the installation/removal device 2 by the eccentric cam 112. However, the present invention is not limited to this and thus, for example, the display change device 1 may be configured so that, instead of providing the eccentric cam 112 and the motor 113, the one similar to the actuator 29 provided for position adjustment of the head part 21 is fitted to the moving part 102.

Moreover, in the example described above, the configuration is exemplified in which the display change device 1 is disposed in the tray discharger 8 disposed at the most downstream side of the dosing system 5. However, the present invention is not limited to this, and thus the display change device 1 may be installed in the tray supply device 6 or the drug dispensing device 7 disposed more upstream thereof, or may be disposed separately and independently in the middle of the conveyance path 9 that connects together the tray supply device 6, the drug dispensing device 7, and the tray discharger 8.

Moreover, the dosing system 5 of the example described above includes the display change device 1 shown in the embodiments described above. However, the present invention is not limited to this, and thus, instead of the display change device 1, the dosing system 5 may be configured to adopt the display change device 150 or the display change device 170 described above.

More specifically, when the display change device 150 is adopted instead of the display change device 1, as is the case described above where the display change device 1 is adopted, the tray 10 is temporarily stopped at a point when the tray 10 arrives at a position opposing the display head part 152. Then, the position adjustment mechanism part 100 is actuated, and the head part 152 is pressed against the card 13 fitted to the tray 10 as shown in FIGS. 12A and 12B. Subsequently, the conveyor device 15*a* is operated, and, as shown by arrows B and C in FIG. 12C, the tray 10 is moved relative to the display head part 152 to erase information displayed on the display surface of the card 13 or write information onto the display surface.

Moreover, when the display change device 170 is adopted instead of the display change device 1 described above, as is the case where the display change devices 1 or 150 is adopted, display on the display part 175 of the card 172 can be changed. More specifically, when the display change device 170 is adopted, as is the case where the display change device 1 is adopted, when the tray 10 arrives at a position opposing the information communication device 171 fitted to the main body part 151, the tray is temporarily stopped. Then, the position adjustment mechanism part 100 is actuated, and the card 172 fitted to the tray 10 and the information communication device 171 are brought close to each other. Subsequently, the controller actuates the information communication device 171, and transmits and receives individual data of a patient assigned to the tray 10 including the name, sex, age, ward, hospital room number, address, phone number, ID number, insurance card number, dosing history, medical history, disease state, height, weight, prescription, injection prescription, comments from the doctor or the pharmacist, precautions at the time of dosing, and the like. As a result, the individual data is stored into the data processing part 173 of the card 172, and also all or part of this individual data is displayed on the display part 175 in an appropriate form such as a character, graphic, a bar code, or the like.

As described above, when the display change device 170 described above is adopted, predetermined data can be displayed on the display part 175, and also various data can be stored into the data processing part 173. Thus, as described above, when the display change device 170 is adopted, by transmitting a radio wave from the information communication terminal 180 prepared separately from the information communication device 171 toward the data processing part 173 of the card 172, the individual data stored in the data processing part 173 can be retrieved or updated.

More specifically, when the display change device 170 is adopted, for example, individual data cumulated on the card 172 can be displayed on the information communication terminal 180 in a form as shown in FIG. 24. Moreover, by incorporating an appropriate program and the like in the information communication terminal 180, for example, an audit system similar to prescription and injection prescription can be established. Therefore, when the display change device 170 is adopted, the reliability of the dosing system 5 can be improved by using the audit system established with the card 172 and the information communication terminal 180 together with printed material, such as prescription, injection prescription, or the like, stored in the tray 10 in the operation procedures shown in FIG. 23. Moreover, adopting, instead of the printed material such as prescription, the audit system established with the card 172 and the information communication terminal 180 permits a reduction in the amount of use of paper medium in the dosing system 5 and omission of devices such as the printer and the like. Therefore, adopting the display change device 170 permits a reduction in the running costs and manufacturing costs of the dosing system 5.

Moreover, when the display change device 170 is adopted, through communication with the information communication terminal 180, information, concerning patient, that is a stored on the IC chip 173*b* of the card 172 and part or all of information displayed on the display part 175 can be erased at a desired timing. More specifically, in terms of protecting privacy and individual information of the patient, it is desirable that after the drugs stored in the tray 10 are dispensed, display information on the card 172 and the information stored on the IC chip 173*b* be erased. Thus, based on this knowledge, the display change device 170 may be configured to transmit a radio wave or a signal toward the card 172 by operating the information communication terminal 180 at the time when dosing is completed and may erase the display information on the card 172 and information stored on the IC chip 173*b*.

More specifically, the display change device 170 may be configured to be provided with a function of monitoring the dosing state based on, for example, information read into the information communication terminal 180 through communication between the card 172 and the information communication terminal 180 (see FIG. 25A), so that a display or the like prompting to select whether or not to erase the display information and the storage information on the card 172 as in FIG. 25B can be provided at a point when it is confirmed that the dosing has been completed and so that the display information and the storage information on the card 172 can be erased based on the selection made at this point. According to such a configuration, sufficient consideration can be given to protection of individual information and storage information of the patient.

BRIEF DESCRIPTION OF THE INVENTION

FIG. 13B is a schematic diagram conceptually showing one usage example of the card shown in FIG. 13A, and FIG. 13C is a schematic diagram conceptually showing a modified embodiment when the card shown in FIG. 13A is adopted.

Figure 16:
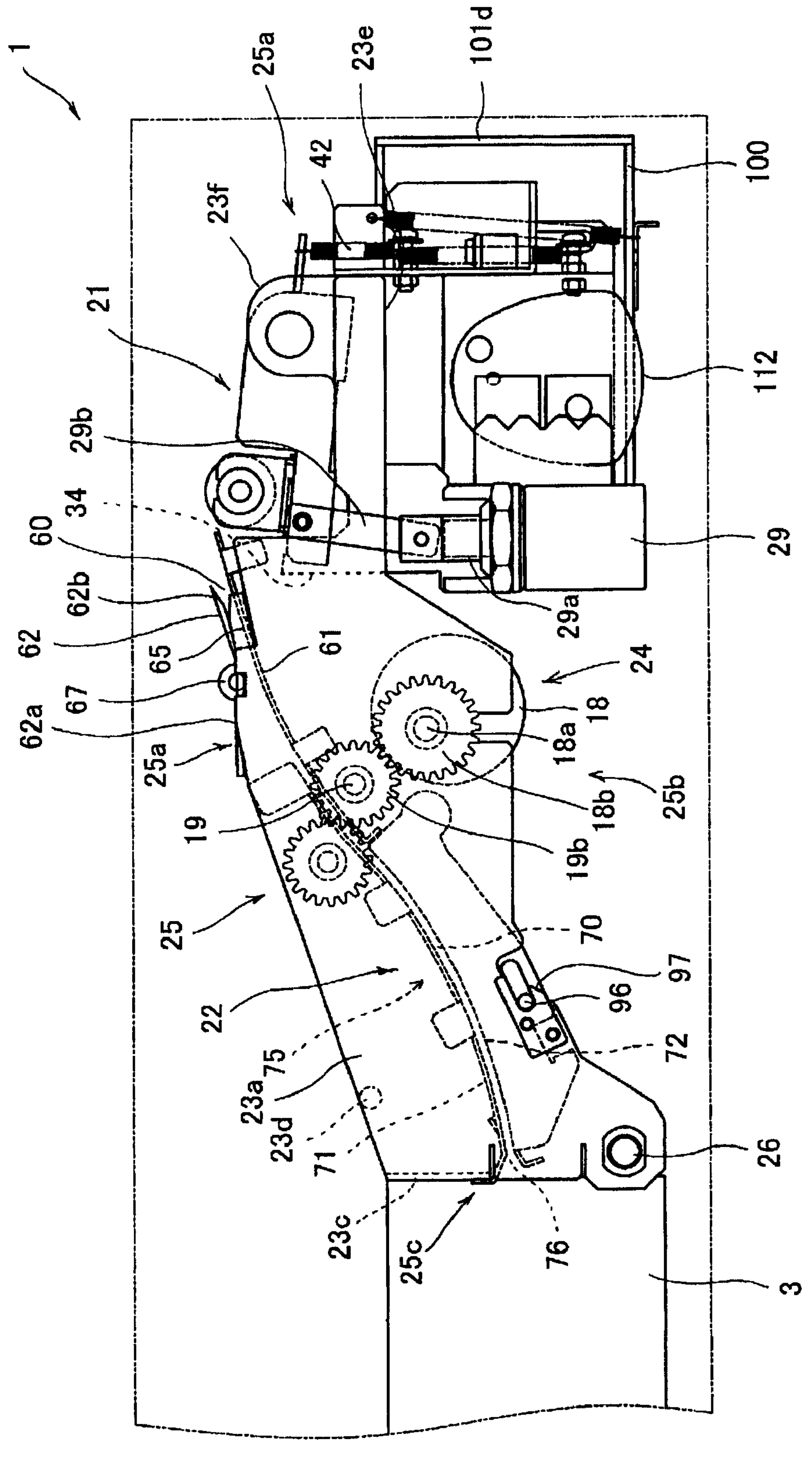
FIG. 16 is a plan view schematically showing the display change device adopted in the tray discharger shown in FIG. 14.
Figure 17:
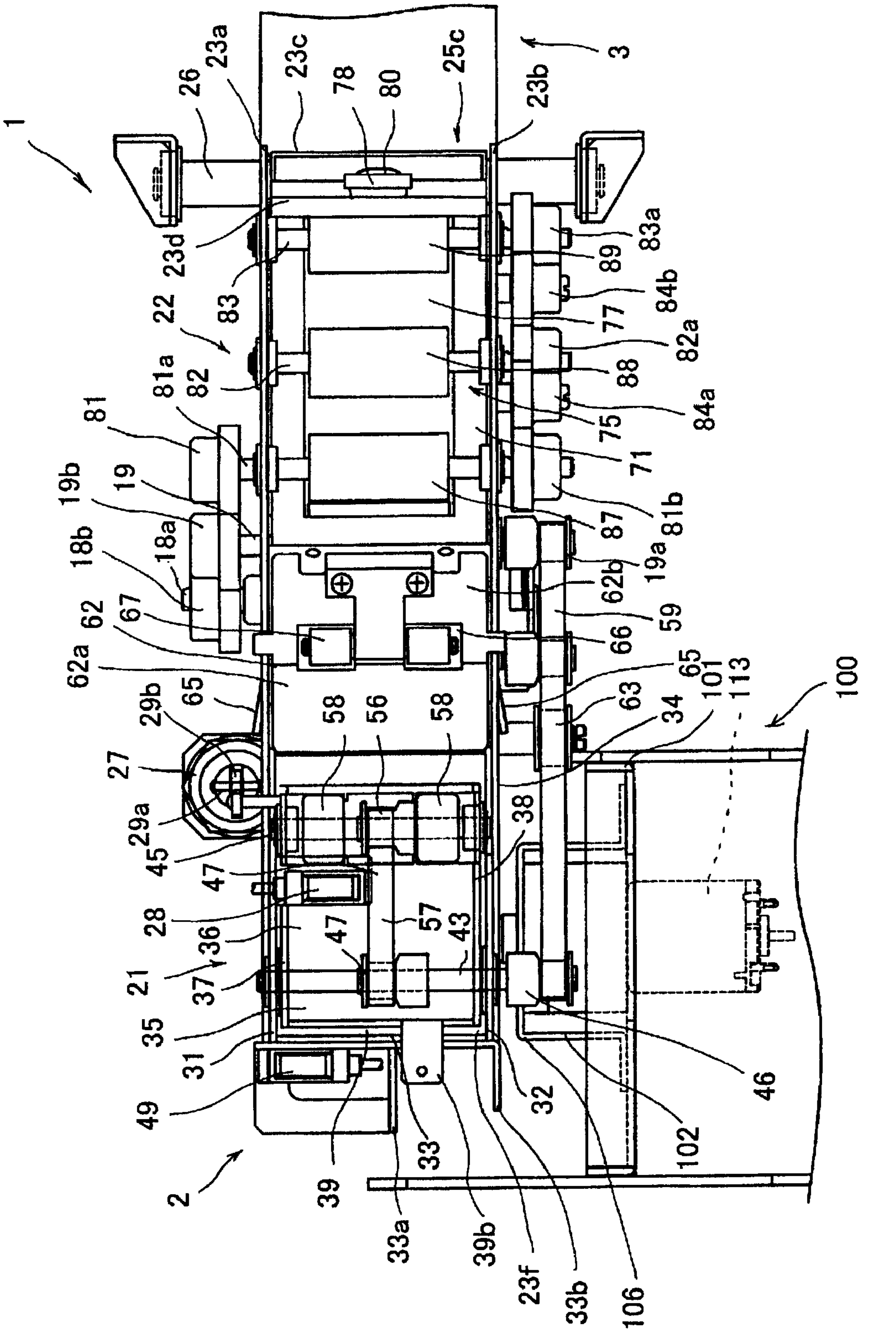
FIG. 17 is an elevation view of the display change device shown in FIG. 16.
Figure 18:
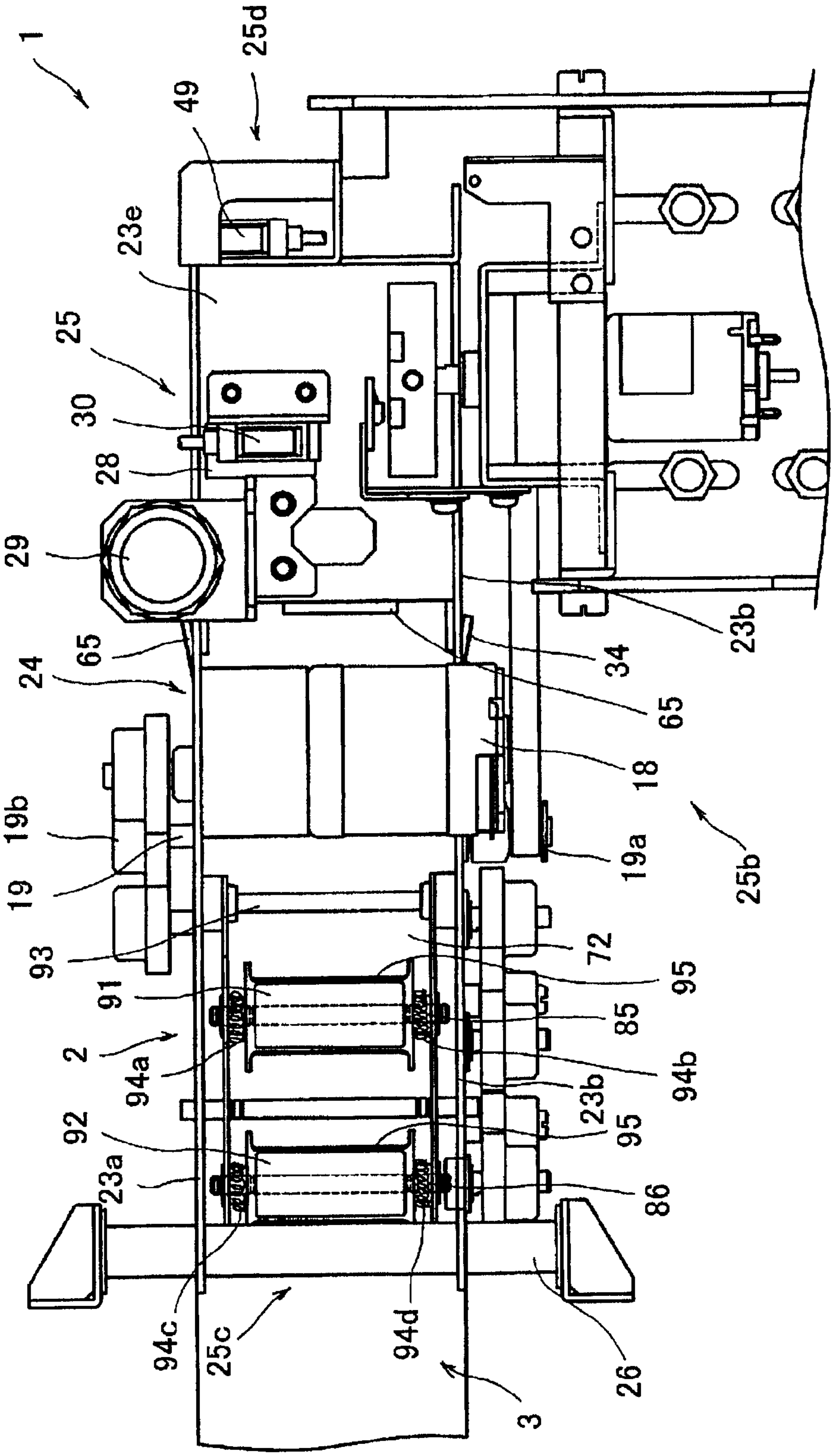
FIG. 18 is a back view of the display change device shown in FIG. 16.
Figure 19:
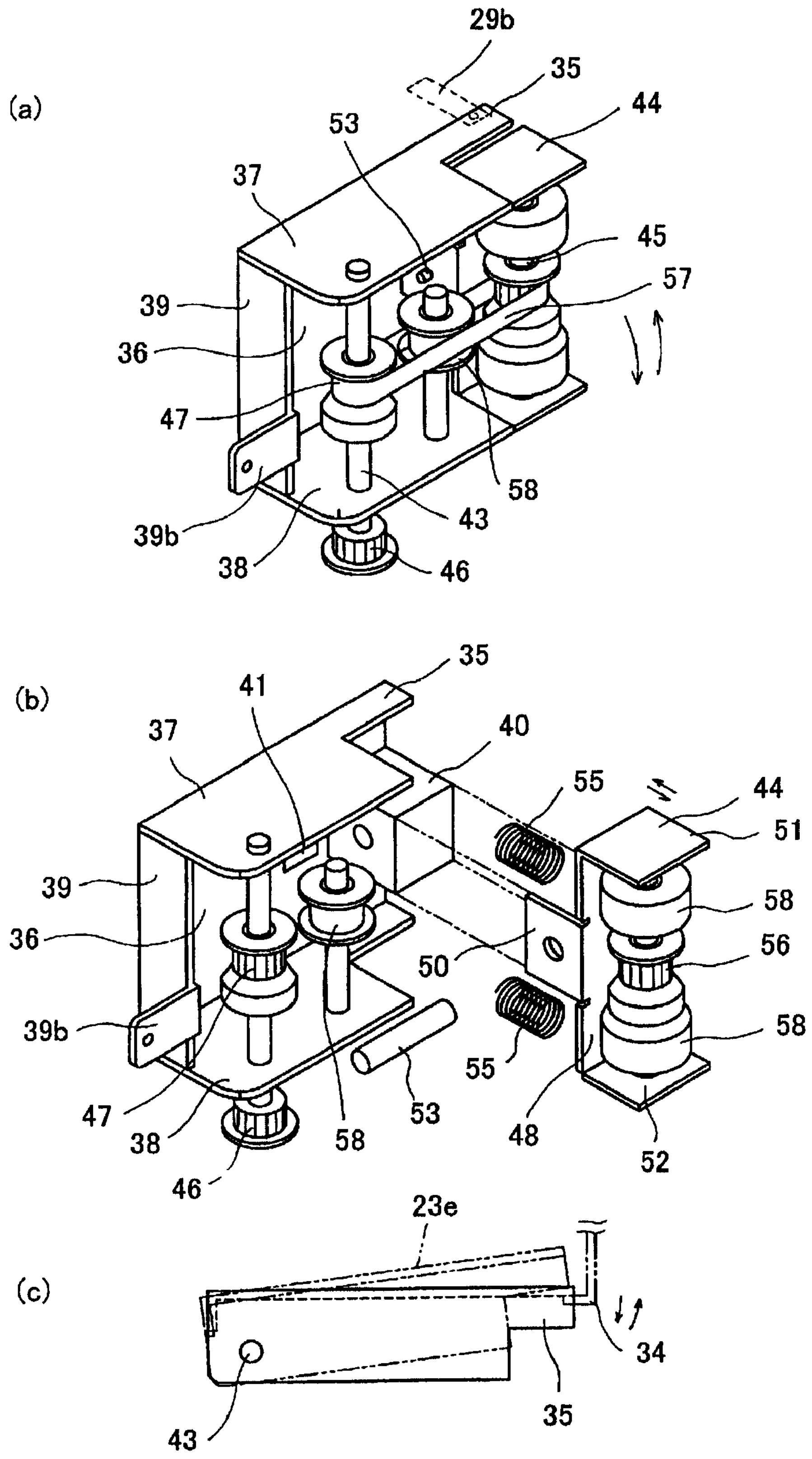
FIG. 19A is a perspective view showing a head part composing the card display change device shown in FIG. 16.
FIG. 19B is an exploded perspective view of FIG. 19A.
FIG. 19C is a conceptual diagram schematically showing the movable range of the head part.
Figure 20:
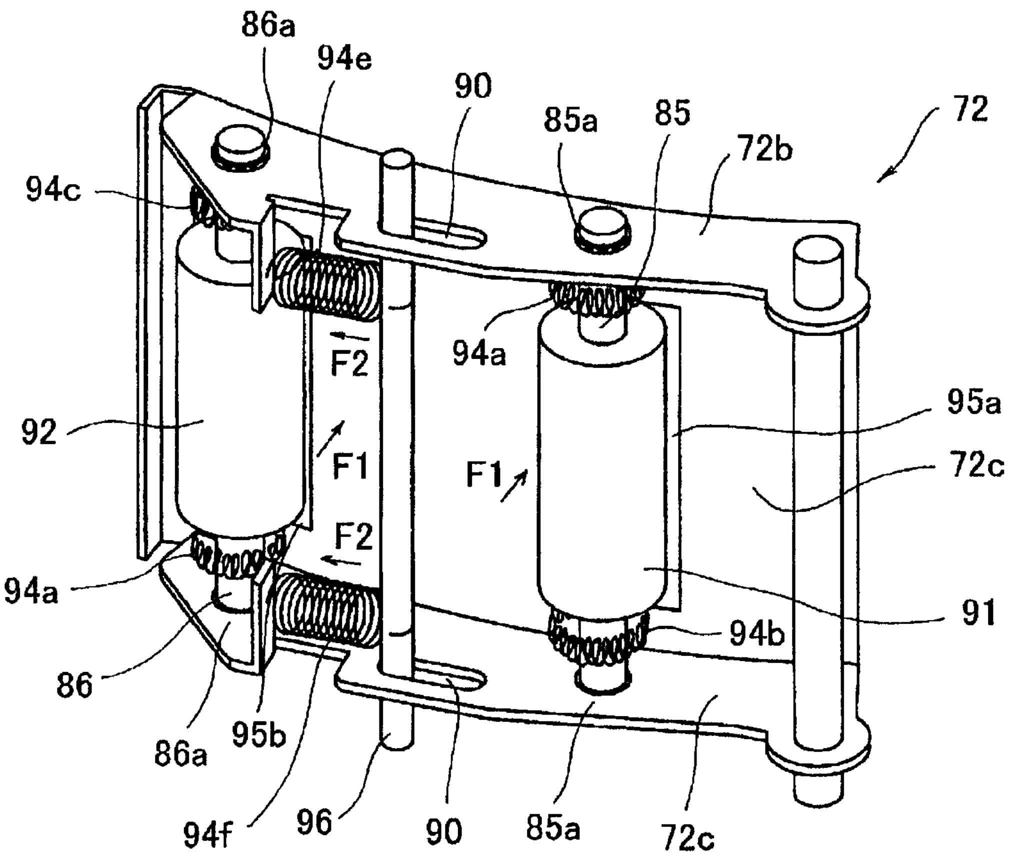
FIG. 20 is a perspective view showing a guide frame adopted in the display change device shown in FIG. 16.
Figure 21:
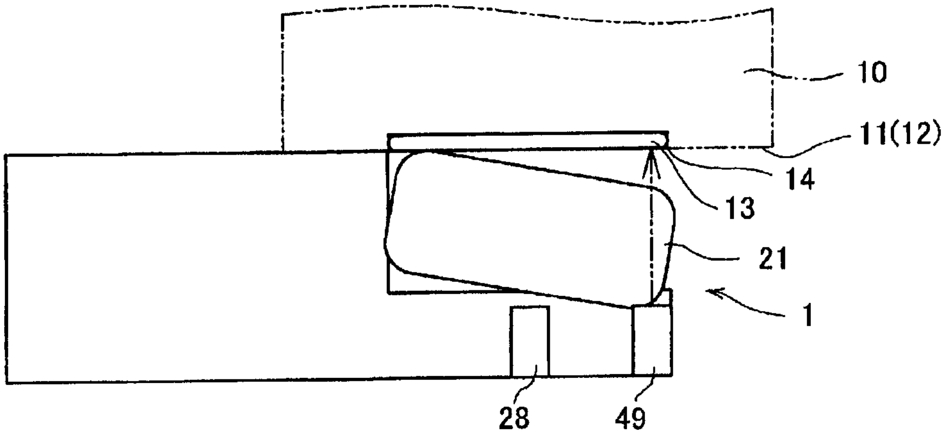
Figure 21:
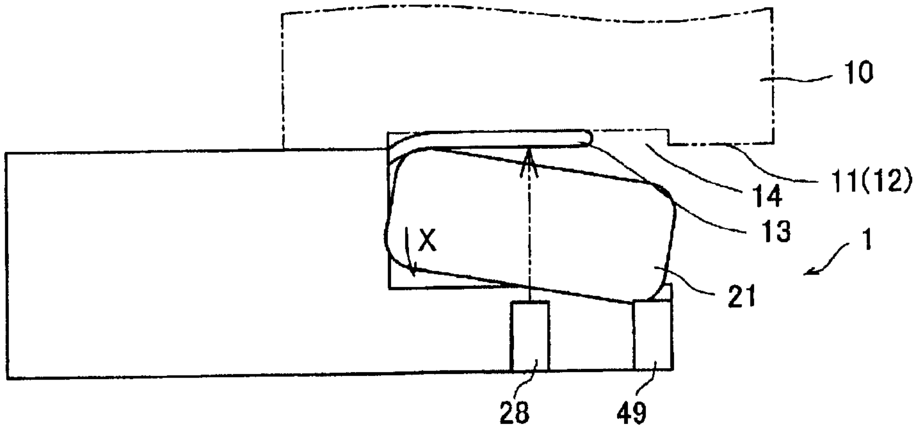
Figure 21:
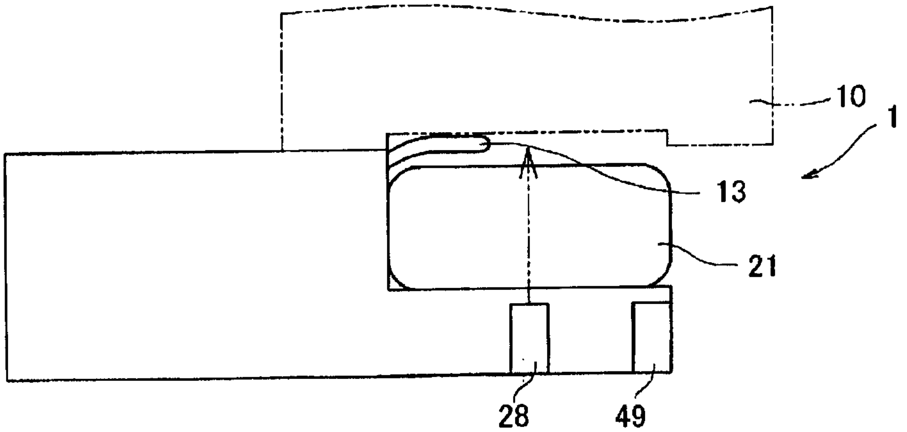

FIGS. 21A, 21B, and 21C are conceptual diagrams schematically showing a first, a second, and a third operation conditions, respectively, of the display change device shown in FIG. 16.

Figure 22:
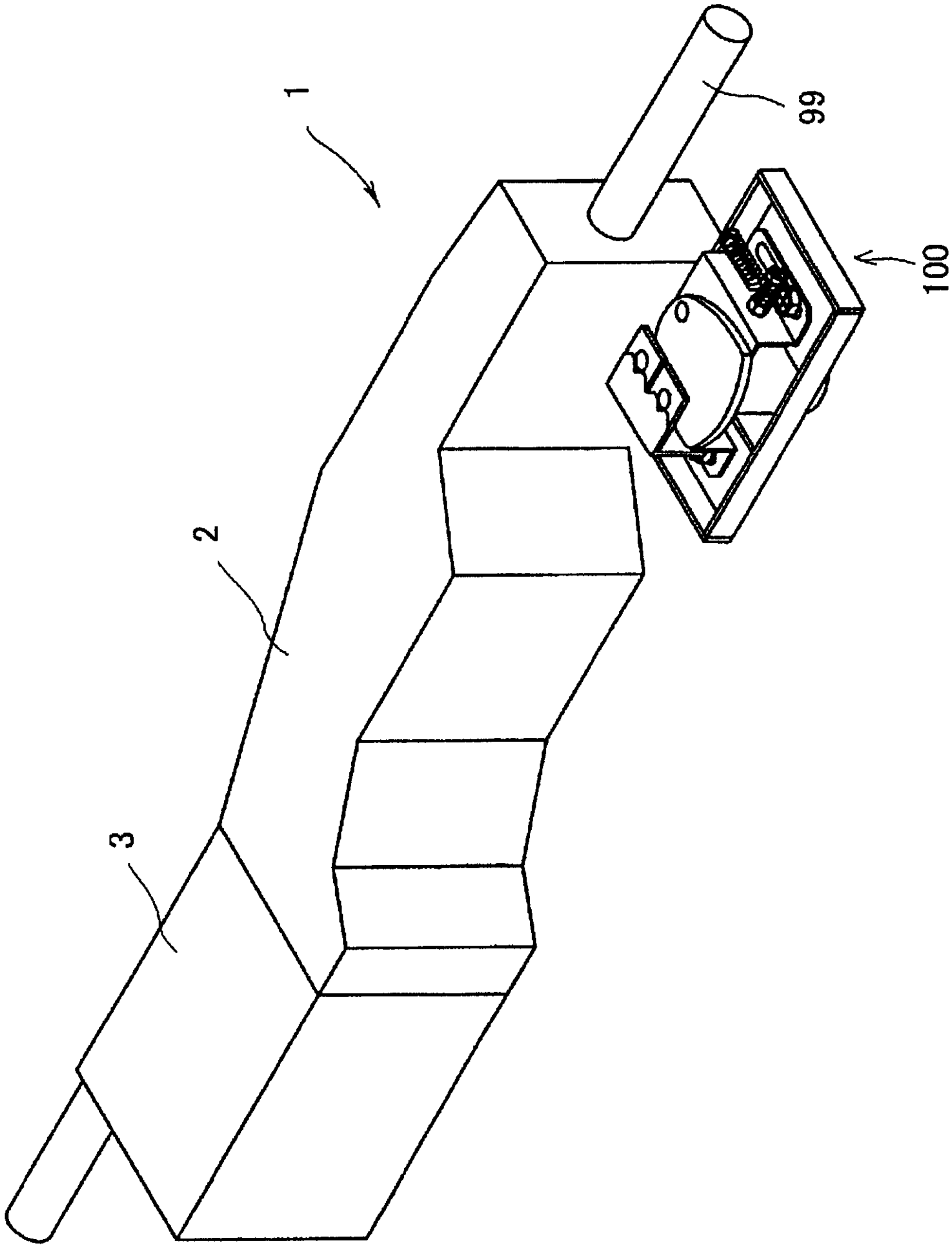

FIG. 22 is a perspective view showing a modified example of the display change device shown in FIG. 16.

Figure 1:
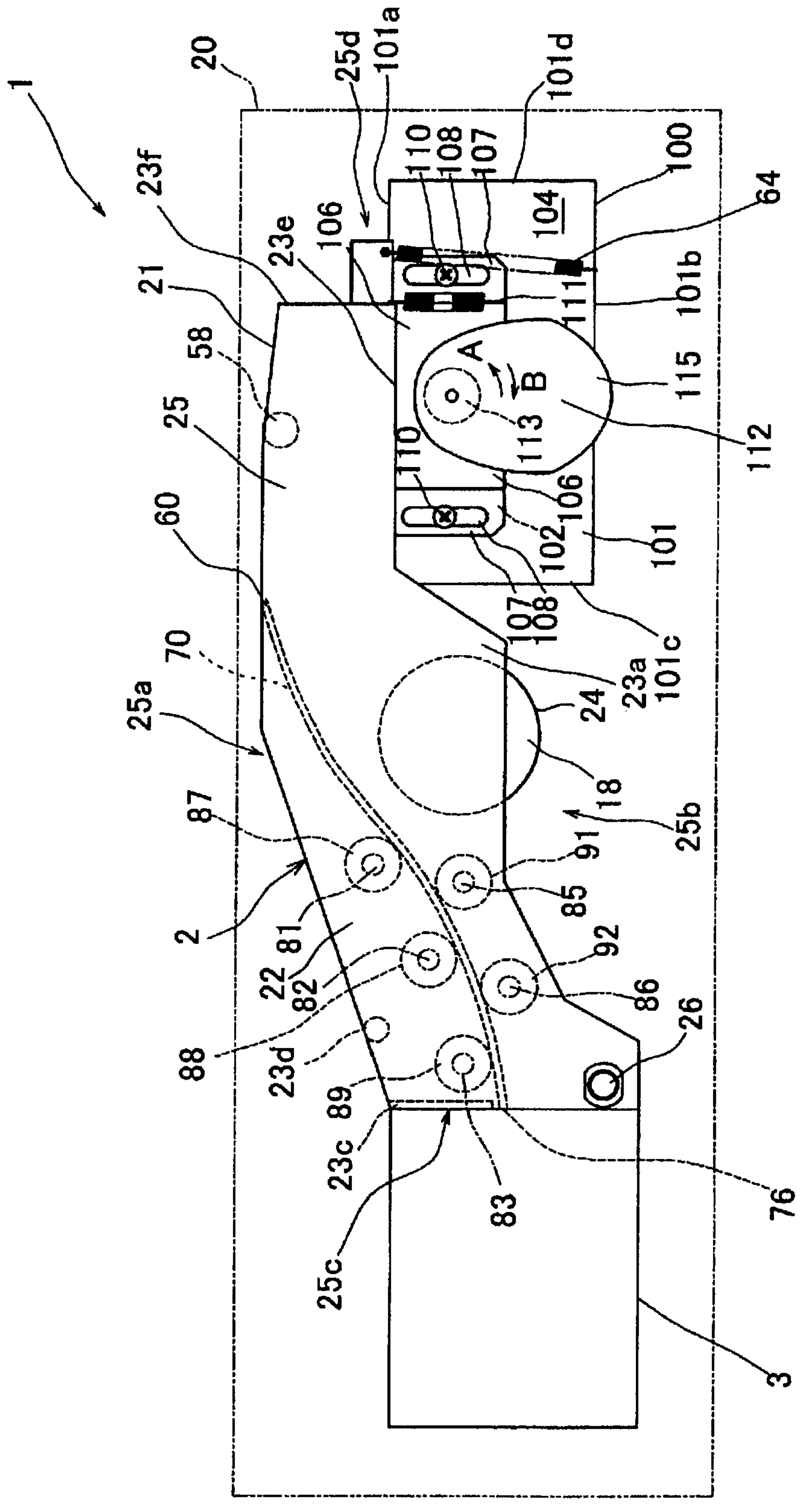
FIG. 1 is a plan view schematically showing a display change device as one embodiment of the present invention.
Figure 2:
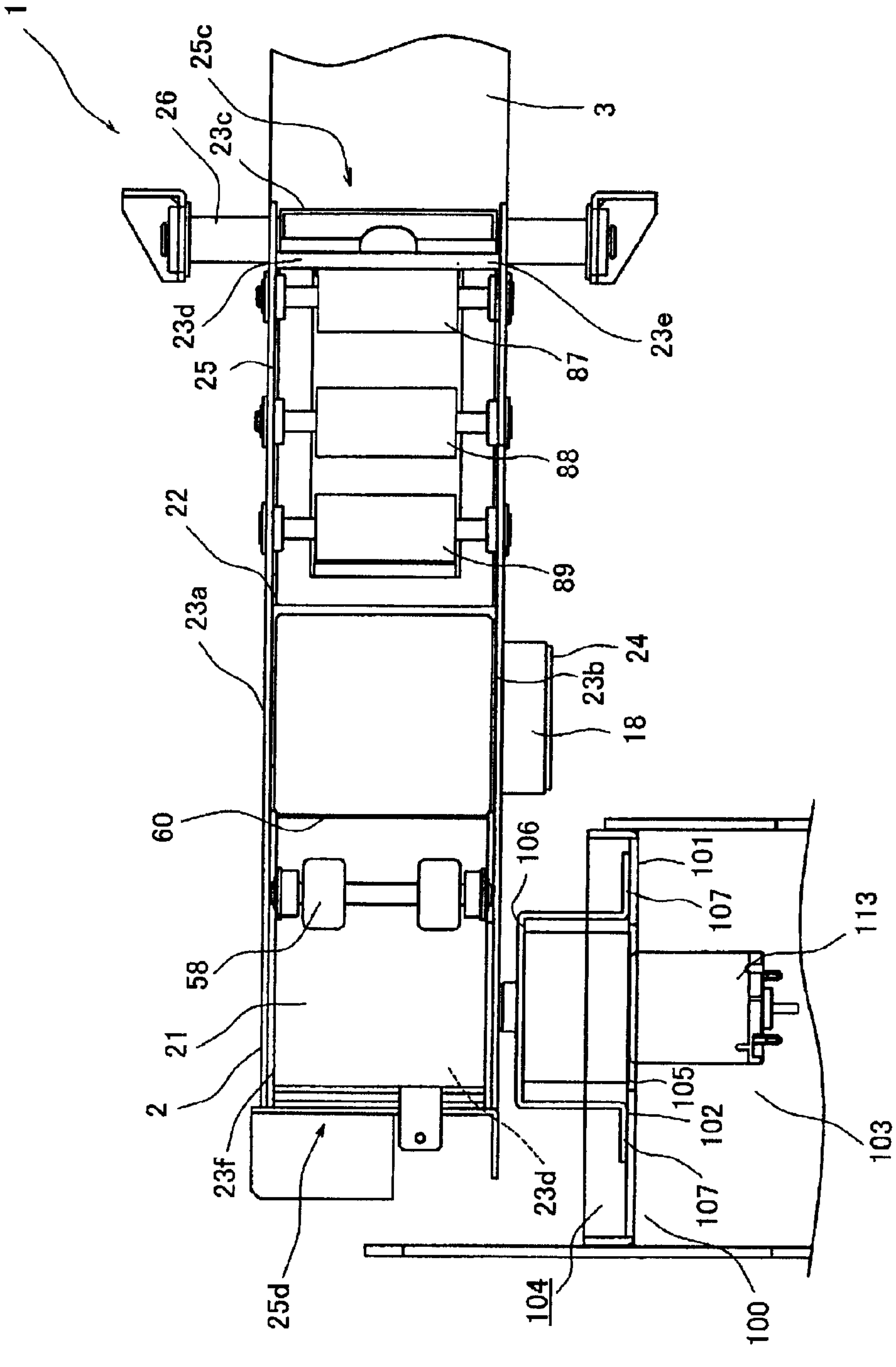
FIG. 2 is an elevation view of the display change device shown in FIG. 1.
Figure 3:
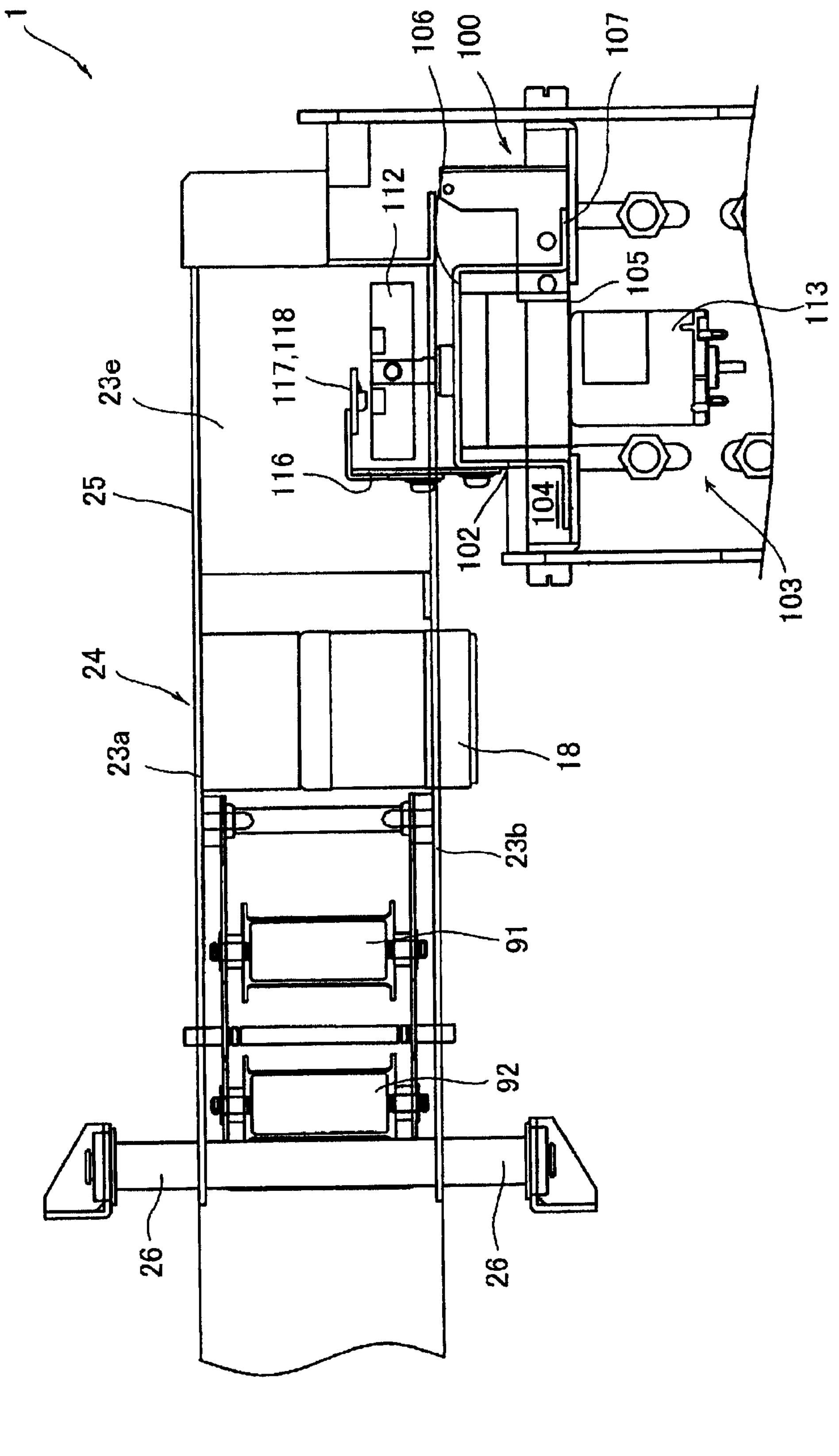
FIG. 3 is a back view of the display change device shown in FIG. 1.
Figure 4:
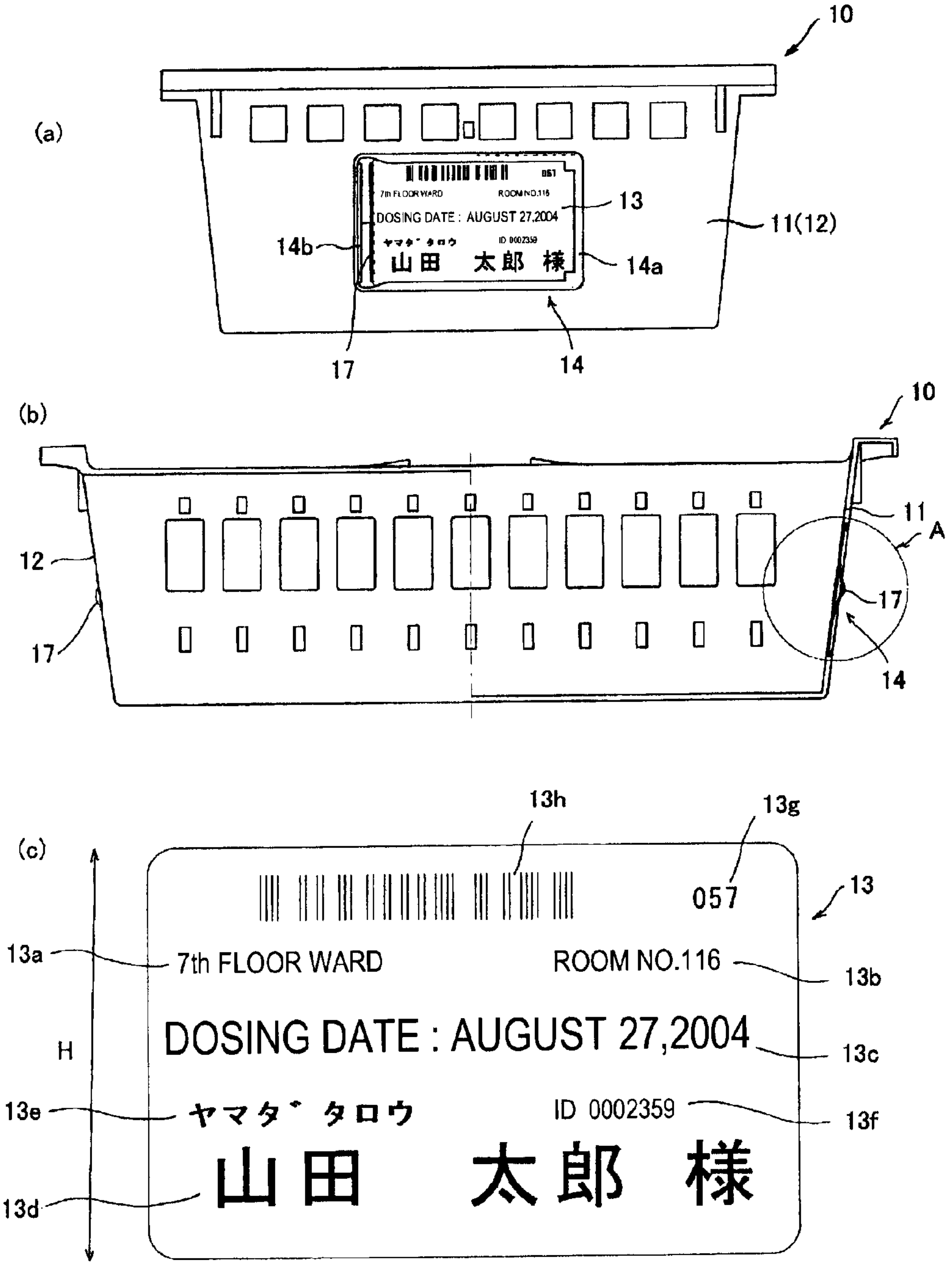
FIG. 4A is an elevation view showing a tray.
FIG. 4B is a side view showing the tray shown in FIG. 4A.
FIG. 4C is an elevation view showing a card fitted to the tray shown in FIG. 4A.
Figure 5:
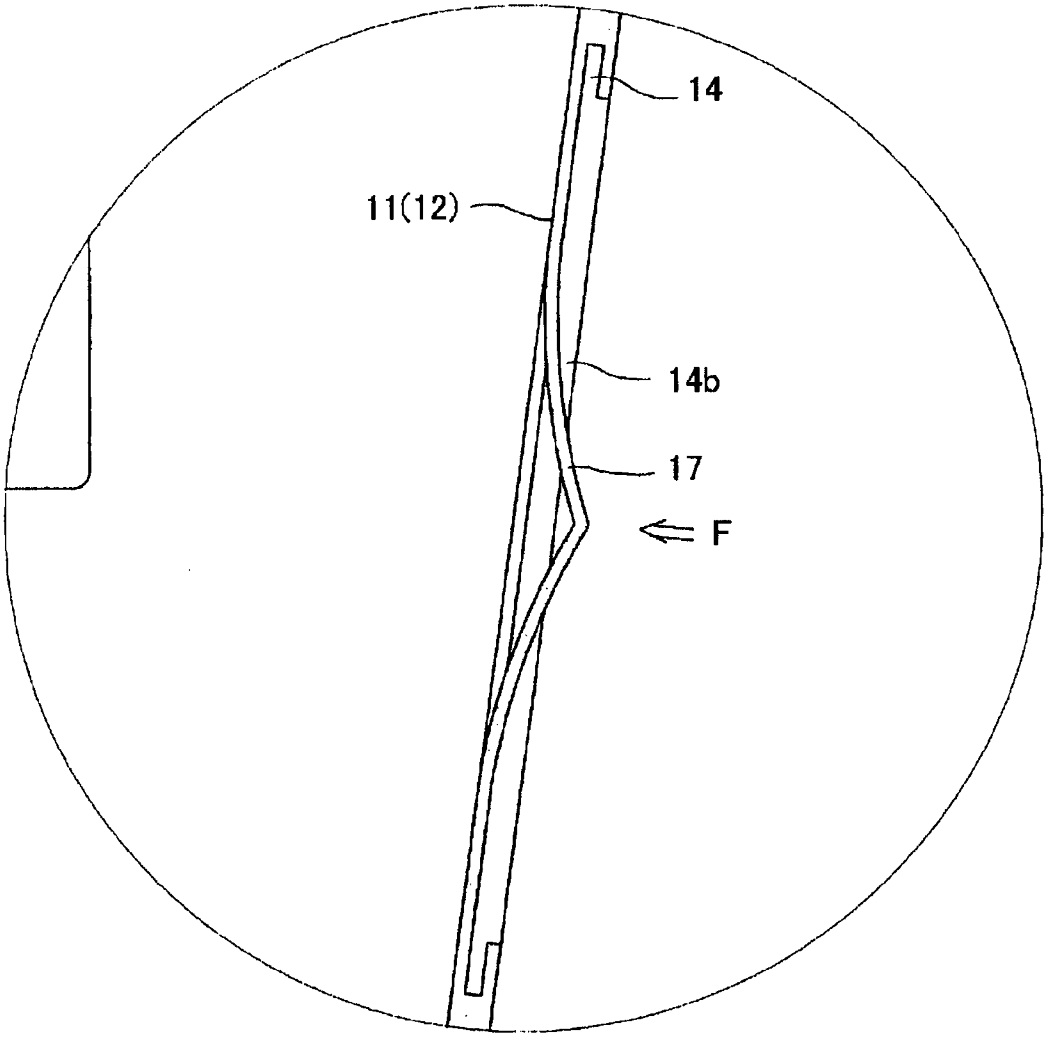
FIG. 5 is an enlarged view of a portion A of FIG. 4B.
Figure 6:
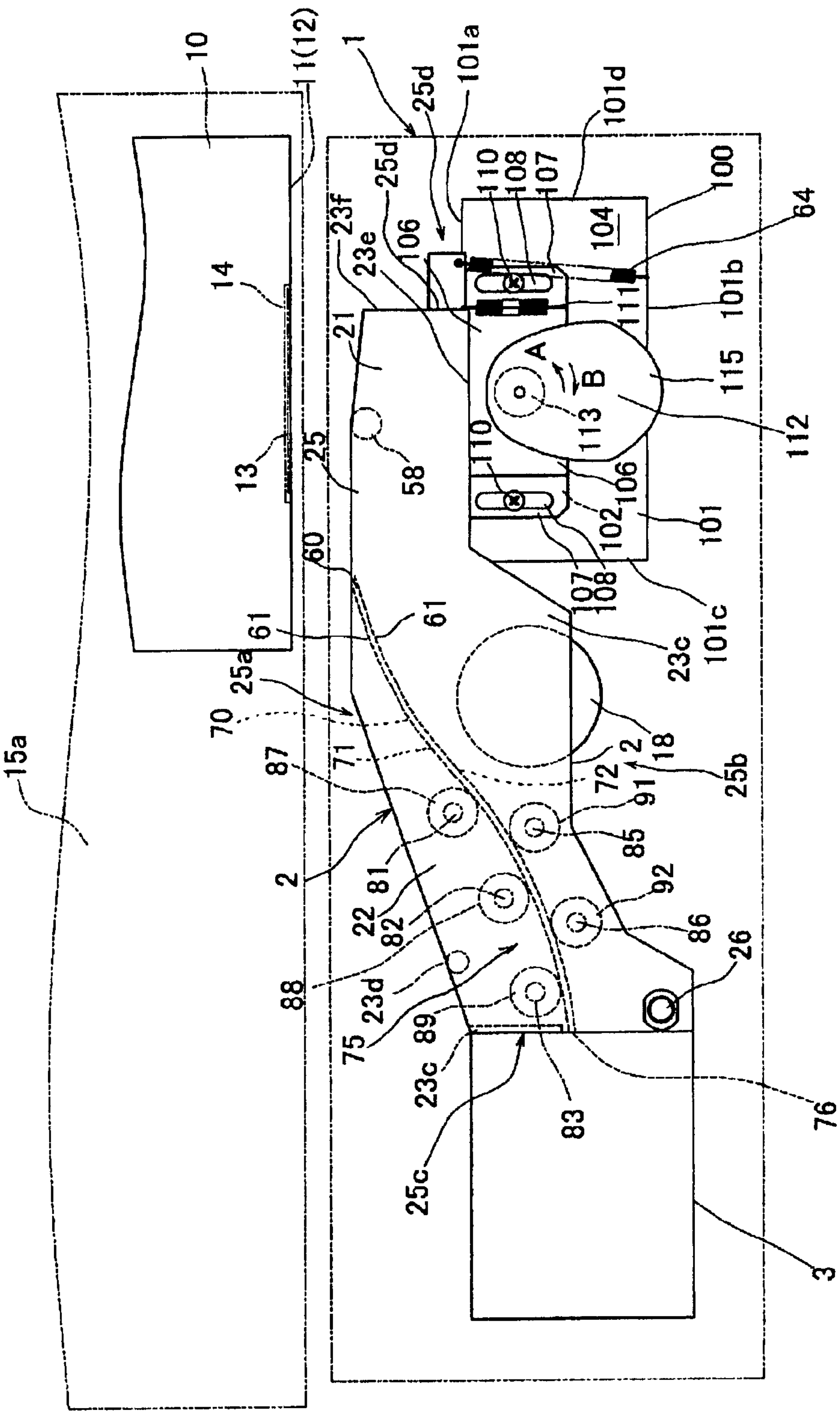
FIG. 6 is a conceptual diagram showing a first operation condition of the display change device shown in FIG. 1.
Figure 7:
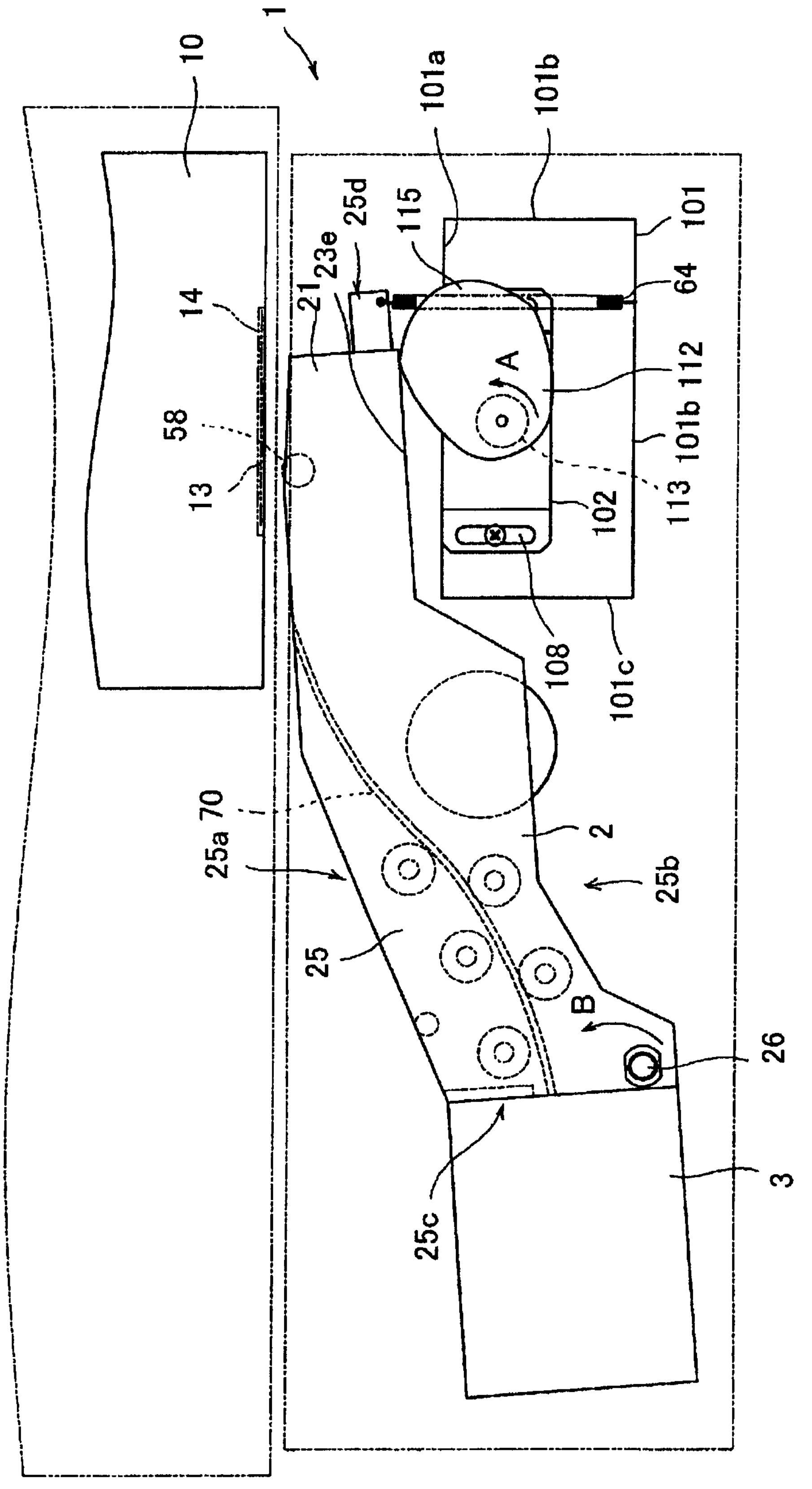
FIG. 7 is a conceptual diagram showing a second operation condition of the display change device shown in FIG. 1.
Figure 8:
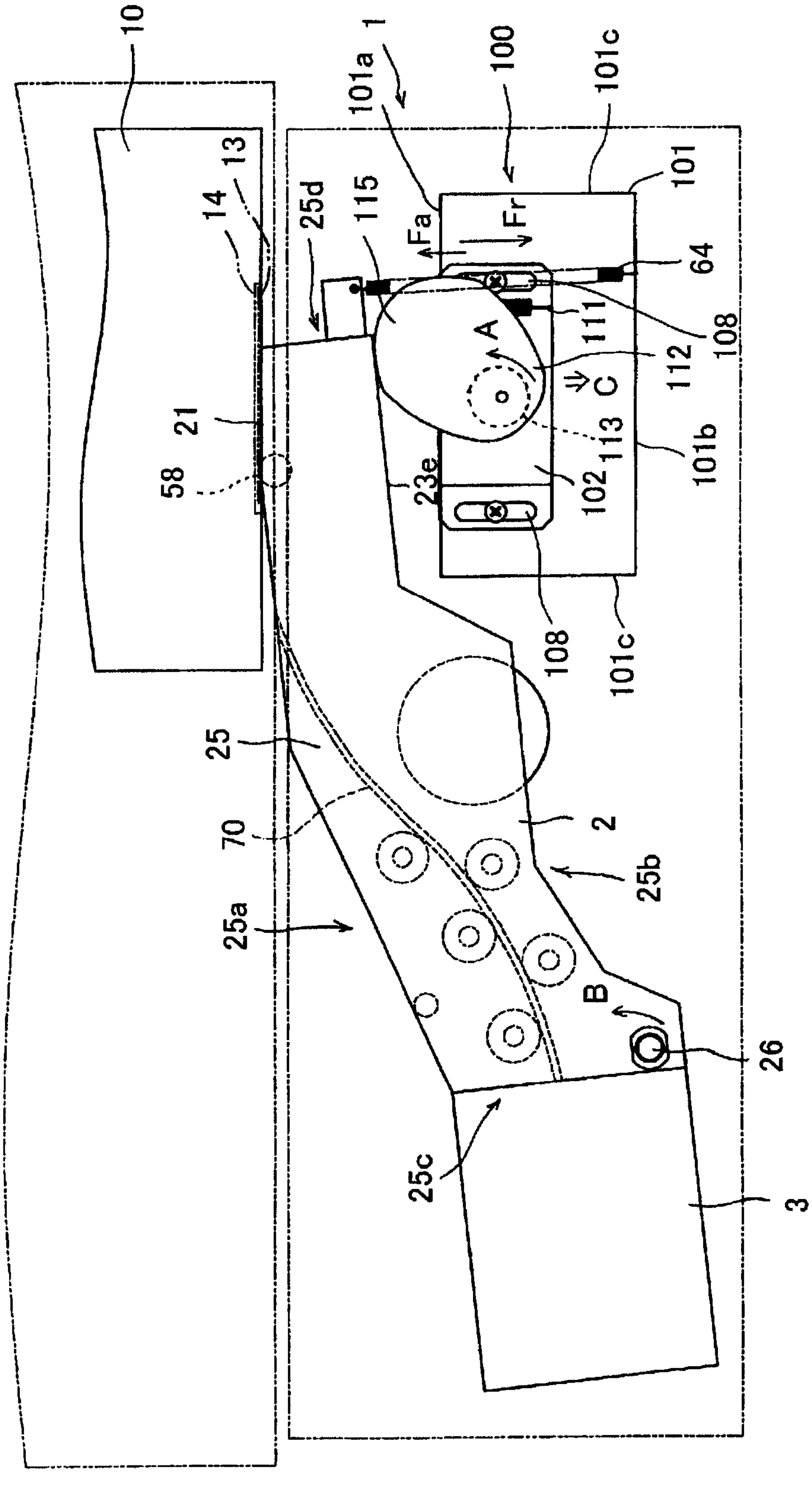
FIG. 8 is a conceptual diagram showing a third operation condition of the display change device shown in FIG. 1.
Figure 9:
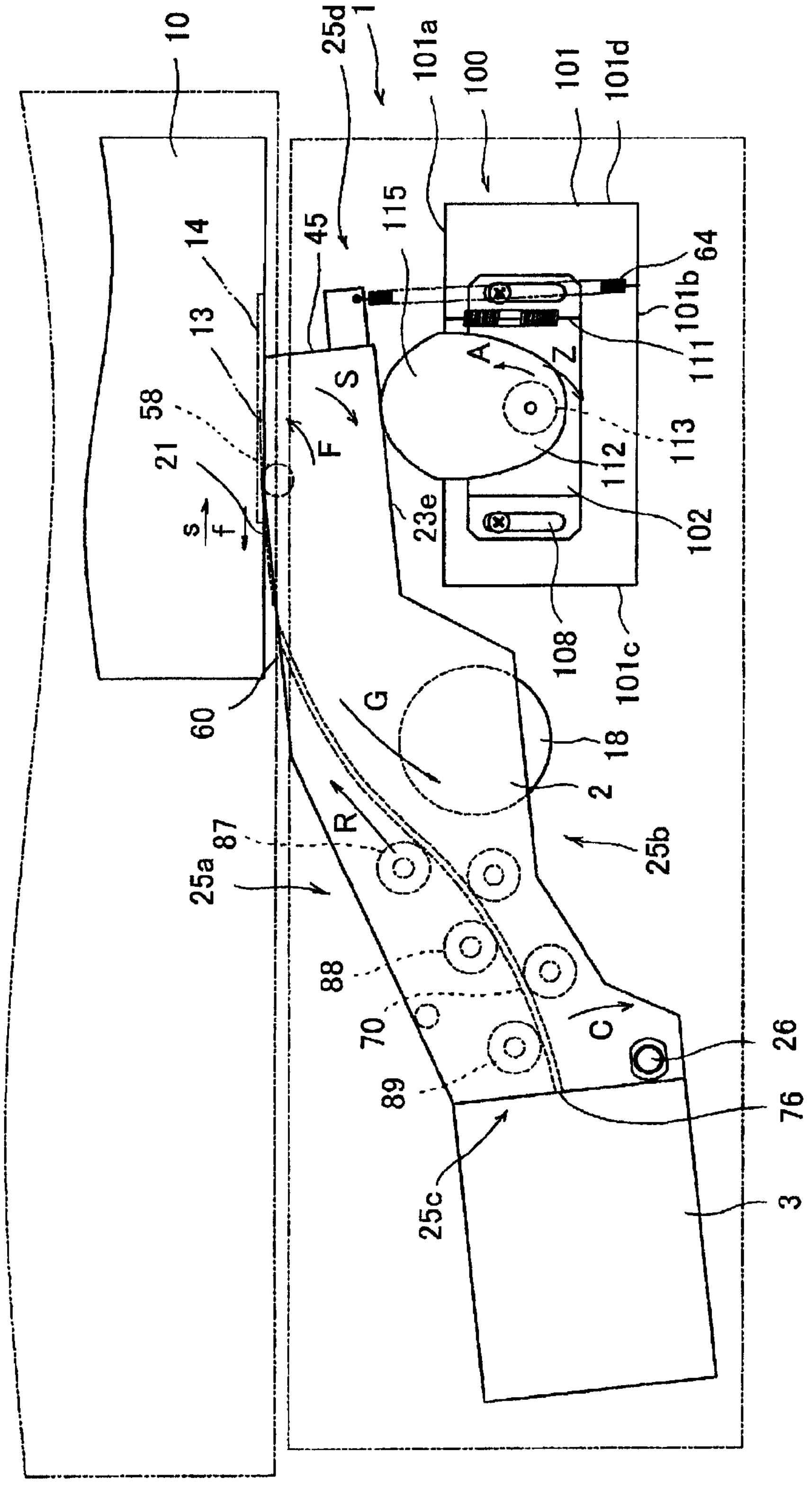
FIG. 9 is a conceptual diagram showing a fourth operation condition of the display change device shown in FIG. 1.
Figure 10:
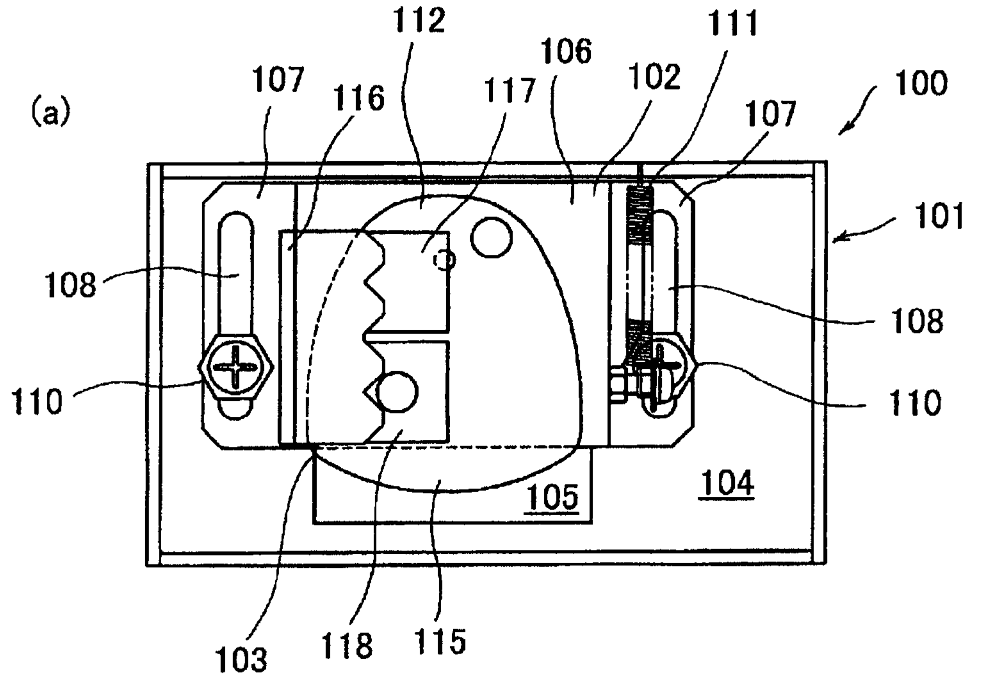
FIG. 10A is an elevation view of a position adjustment mechanism part adopted in the display change device shown in FIG. 1.
FIG. 10B is a perspective view of FIG. 10A.
Figure 10:
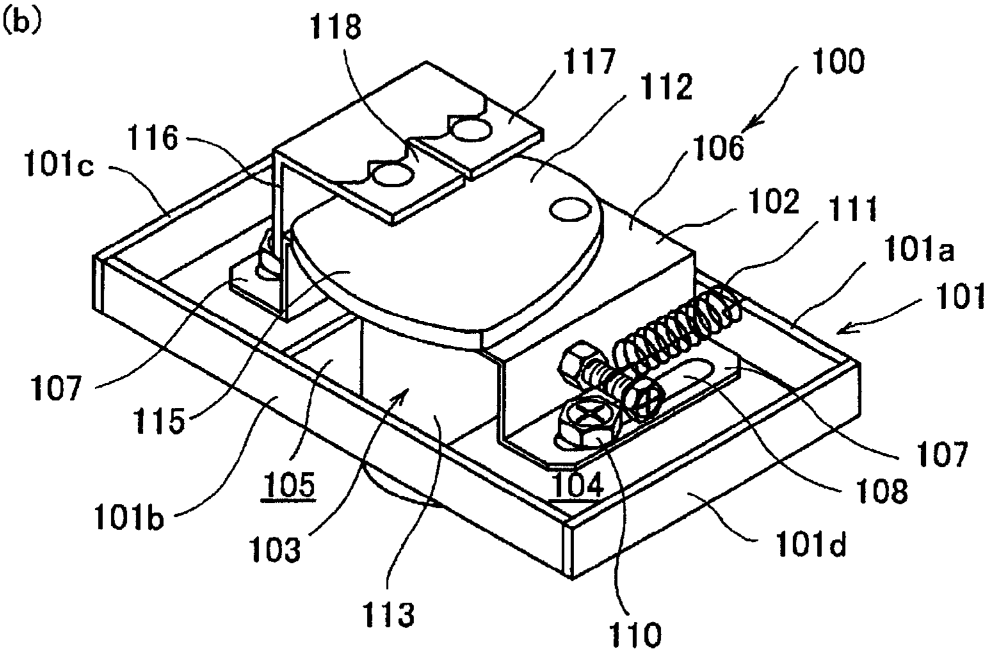
Figure 11:
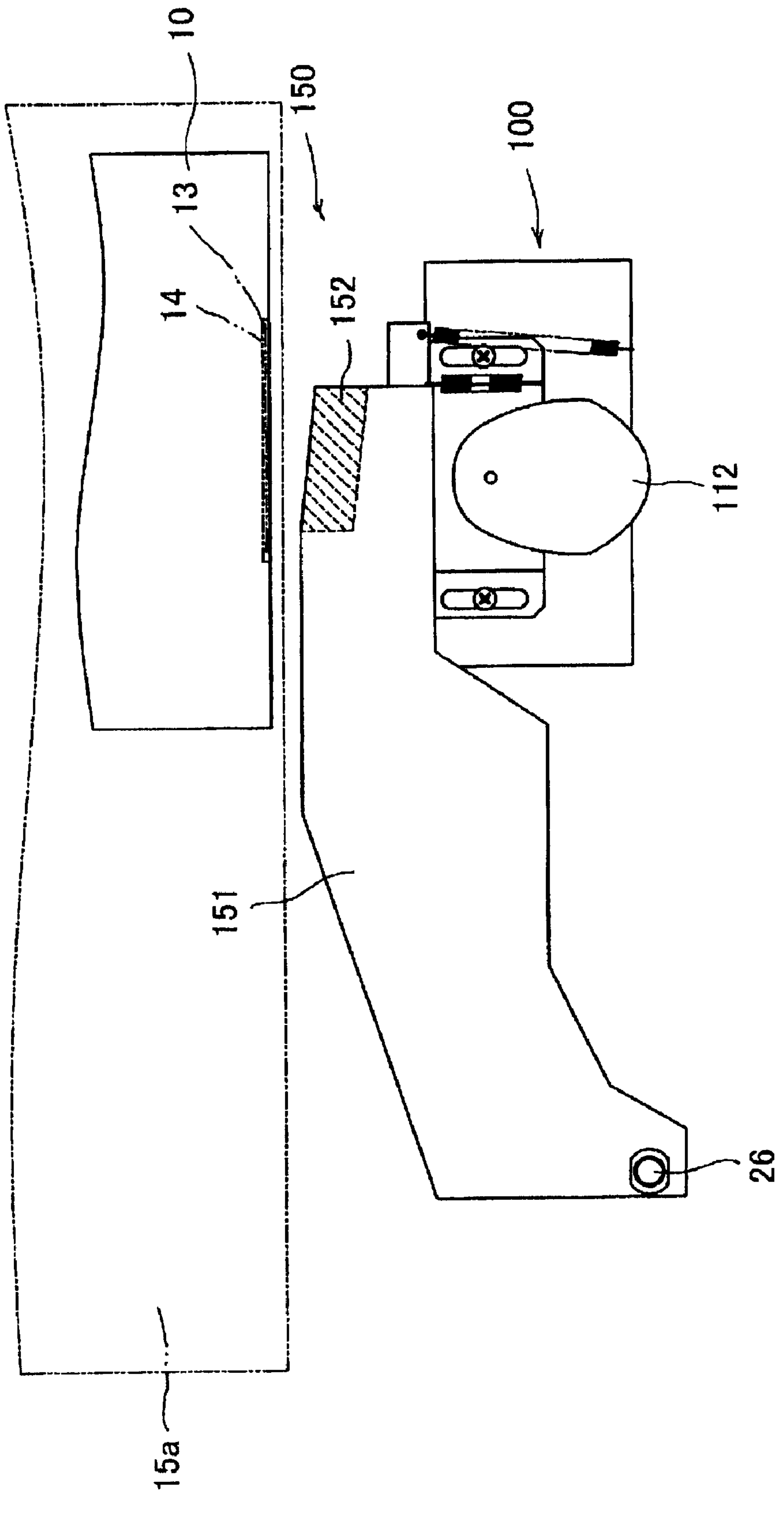
FIG. 11 is a plan view schematically showing a modified example of the display change device shown in FIG. 1.
Figure 12:
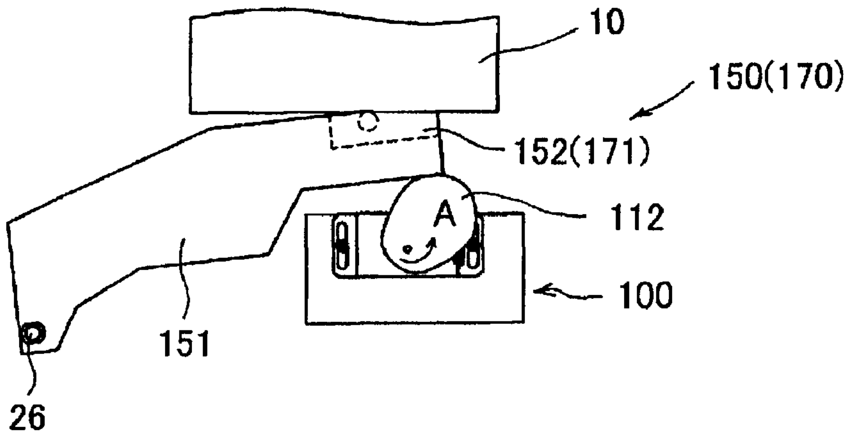
FIG. 12A is a conceptual diagram showing a first operation condition of a display change device shown in FIG. 14.
FIG. 12B is a conceptual diagram showing a second operation condition thereof.
FIG. 12C is a conceptual diagram showing a third operation condition thereof.
Figure 12:
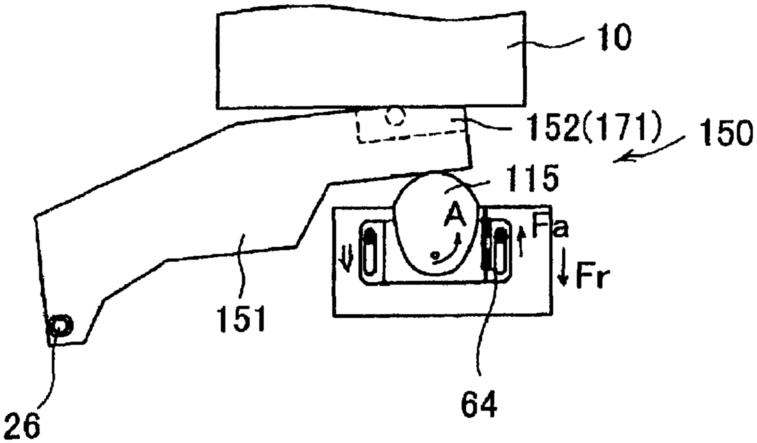
Figure 12:
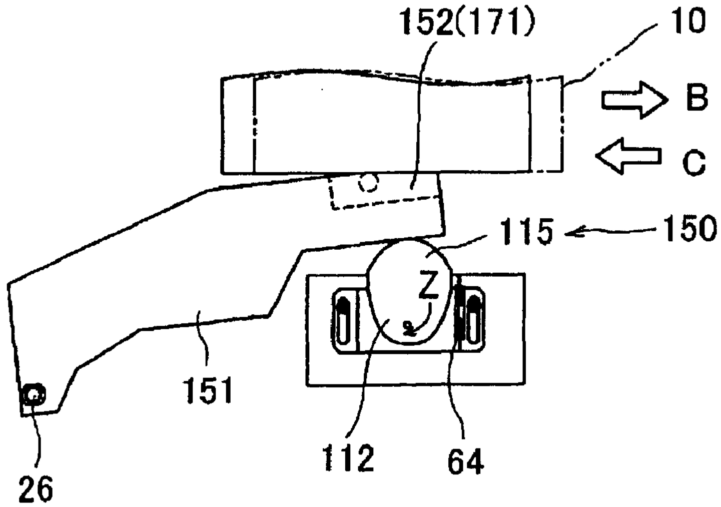
Figure 13:
FIG. 13 is an elevation view showing a modified example of the card.
Figure 13:
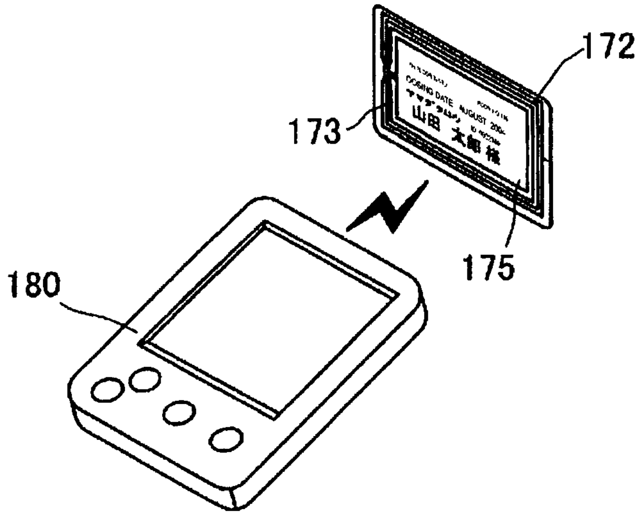
Figure 13:
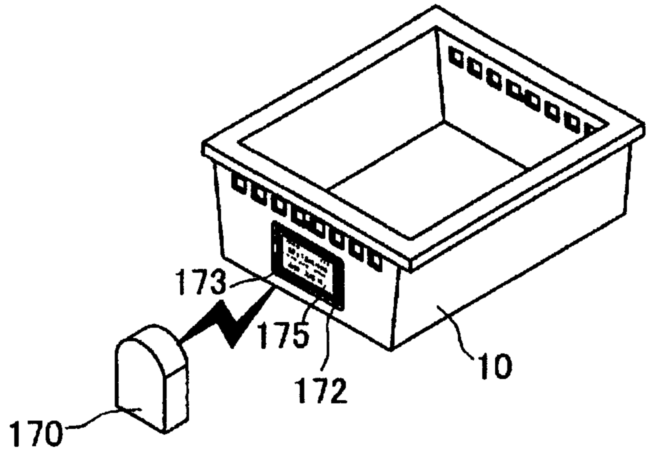
Figure 14:
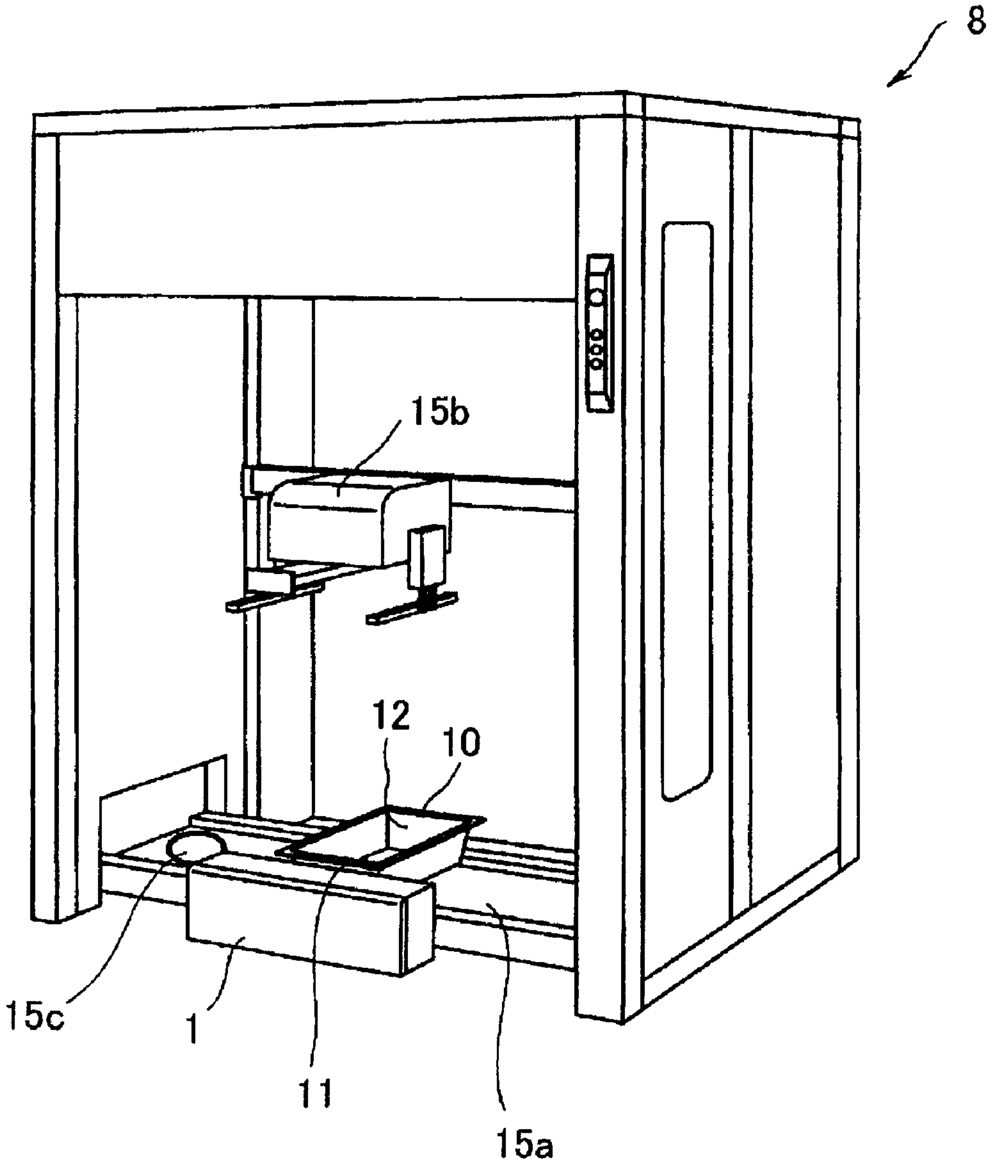
FIG. 14 is a perspective view showing a tray discharger adopted in a dosing system as one example of the invention.
Figure 15:
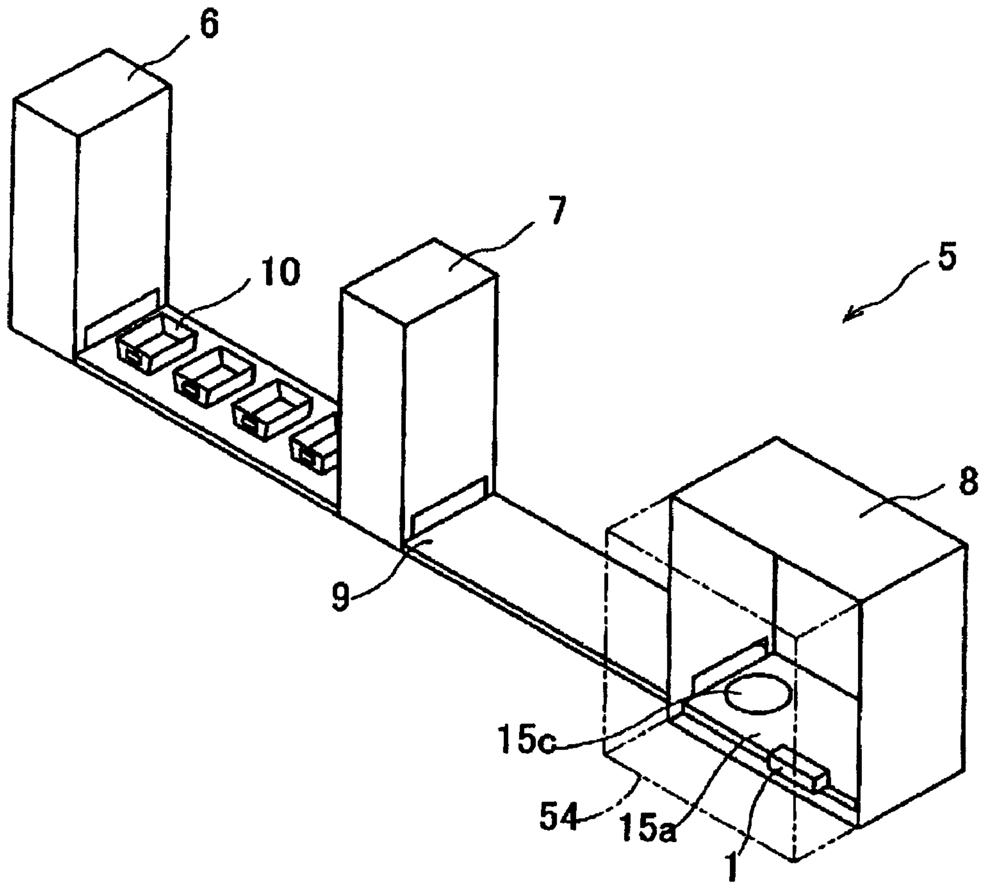
FIG. 15 is a perspective view schematically showing a dosing system as one example of the invention.
Figure 23:
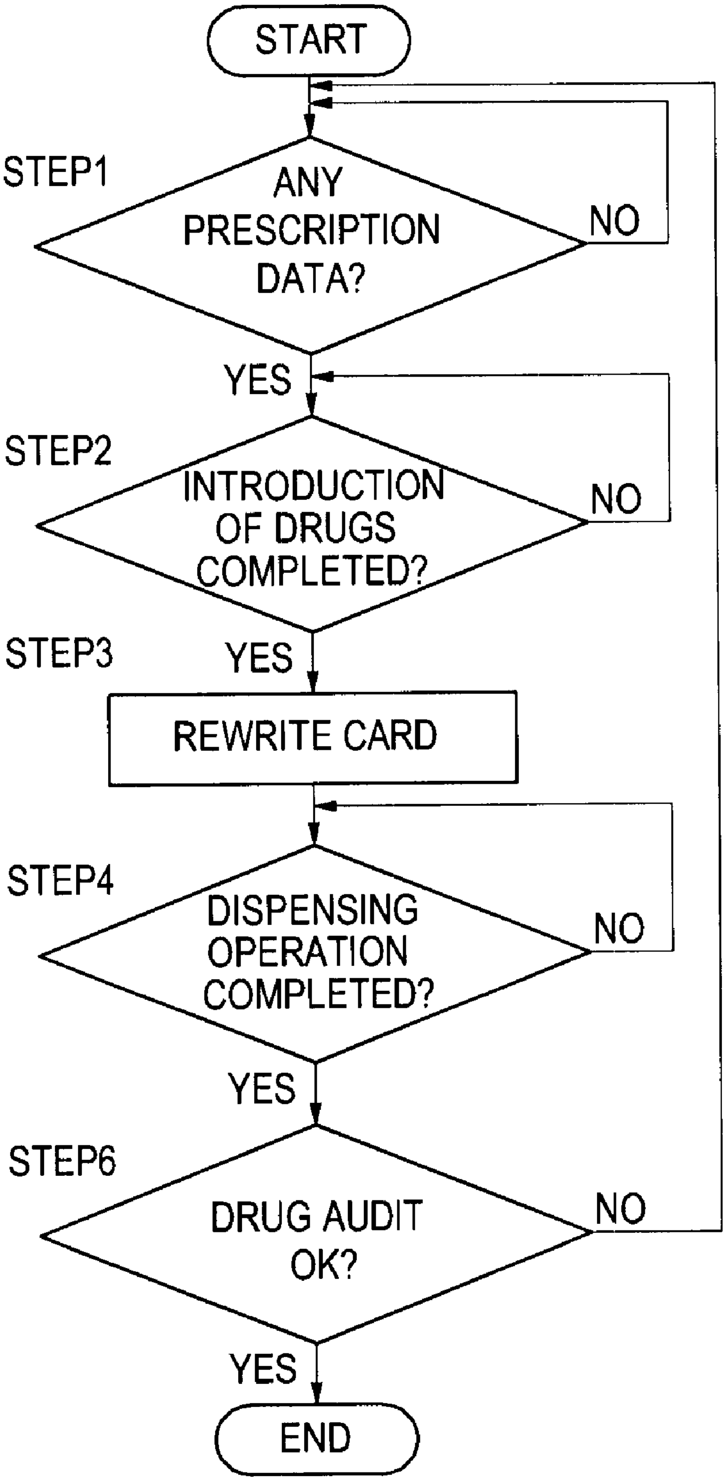

FIG. 23 is a flowchart showing an example of the dosing system shown in FIG. 15.

Figure 24:
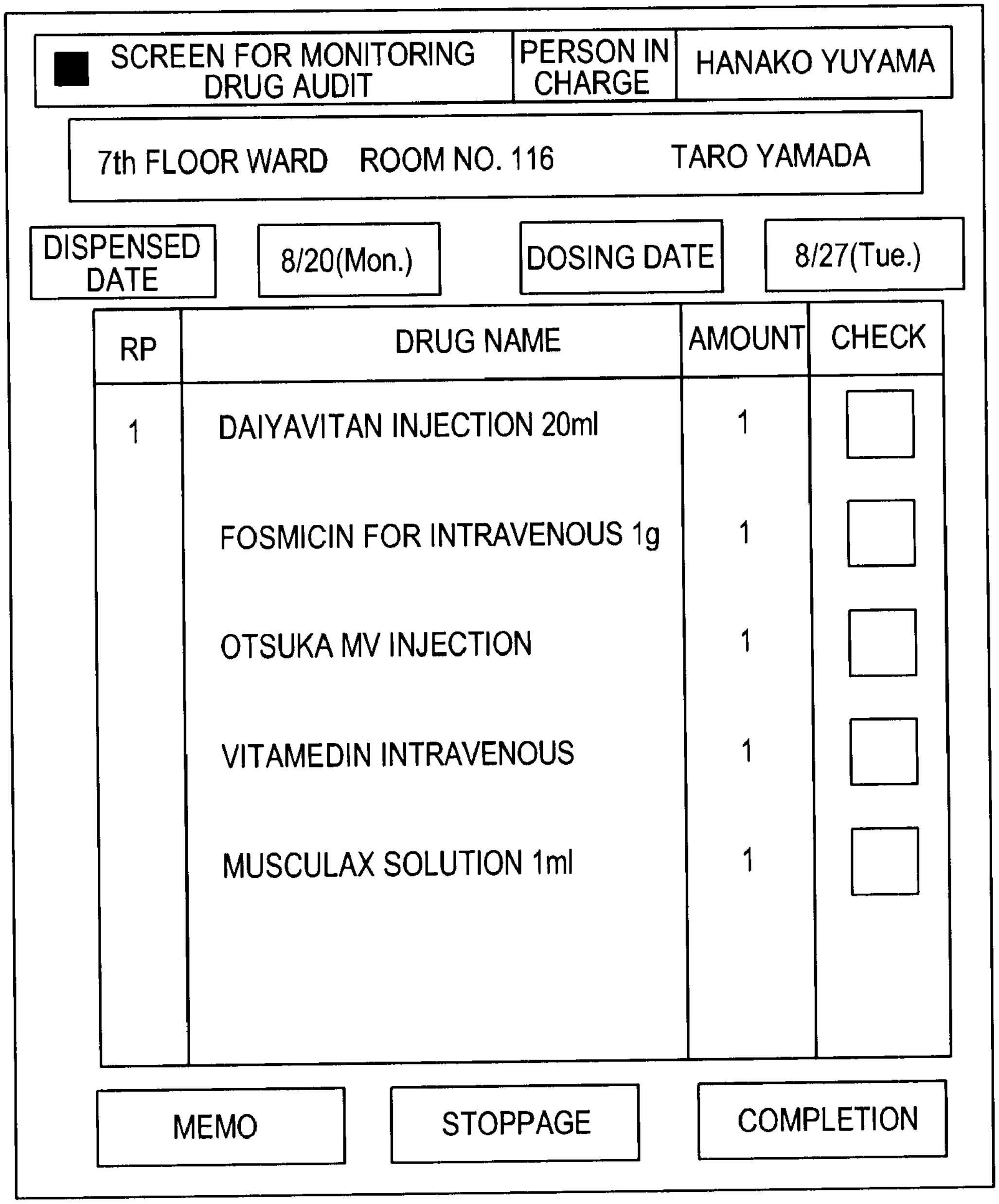

FIG. 24 is a schematic diagram conceptually showing one example of a display screen of an information communication terminal.

Figure 25:
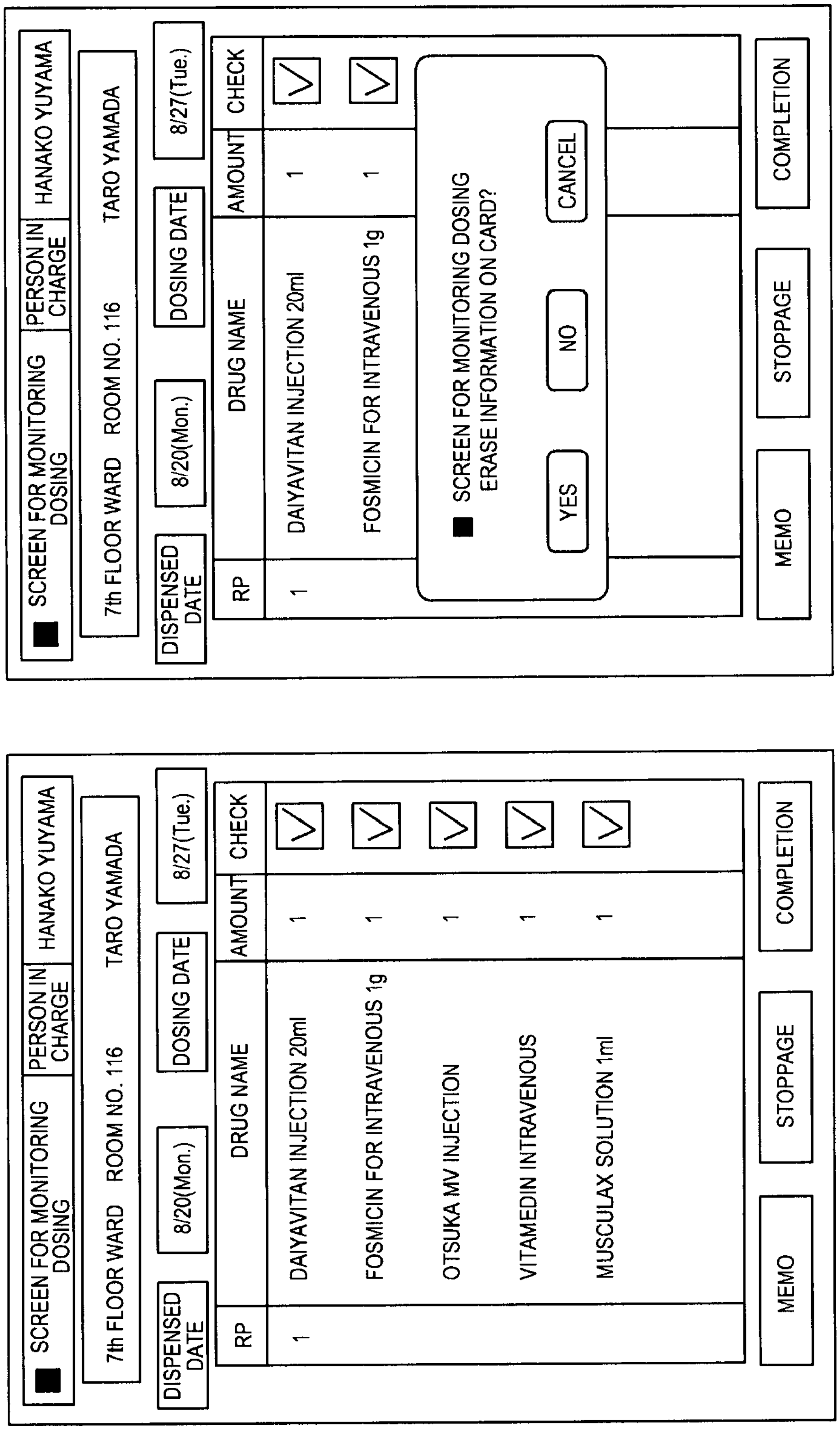

FIG. 25A is a schematic diagram conceptually showing one example of the display screen of the information communication terminal when dosing is completed, and FIG. 25B is a schematic diagram conceptually showing one example of a screen display prompting for selecting whether or not to erase display information or storage information on the card.

REFERENCE NUMERALS

1, 150, 170 Display change device
2 Installation/removal device (installing and removing means)
3 Card display change device (display changing means)
5 Dosing system
10 Tray (conveyed object)
13 Card
14 Fitting part
14*b* Insertion port
17 Projecting part (closing member)
21 Head part
23*e* Pressure reception wall
29 Actuator (gap adjusting means)
44 Base
53 Swinging shaft
58 Roller (card moving means)
62 Tray pressing piece (release means)
70 Card passage
71 Guide frame (installing and removing side wall surface)
72 Guide frame (pressure receiving side wall surface)
87, 88, 89 Roller (card feed means)
99 Shaft body
100 Position adjustment mechanism part (moving means)

101 Seat member
102 Moving part
103 Drive part
112 Eccentric cam (pressing means)

The invention claimed is:

1. A dosing system, comprising:

a conveyed object including: a data processing part configured to generate an electromotive force when receiving a radio wave and to perform data transmission and reception by utilizing the electromotive force; and a display part electrically connected to the data processing part and configured to display a part or all of a data received by the data processing part, the conveyed object being conveyed by a conveyor device; and an information communication device configured to transmit the data to the data processing part, wherein the dosing system is configured to change display information displayed on the display part, wherein the dosing system is configured to write and erase the display information displayed on the display part by using an electromotive force generated upon data processing between the data processing part and the information communication device, wherein the data processing part includes a storage means for storing the data transmitted from the information communication device, wherein the dosing system is configured to change the display information displayed on the display part of the conveyed object or a storage information stored in the storage means by an information communication terminal provided separately from the information communication device, and wherein the dosing system has a function of monitoring a dosing state based on an information read into the information communication terminal through communication between the data processing part and the information communication terminal and is configured to prompt to select whether or not to erase the display information of the display part or the storage information when completion of dosing is confirmed.

2. The dosing system of claim 1, further comprising a moving means for moving the information communication device in a direction of approaching the conveyed object.

3. A dosing system, comprising:

a conveyed object supply means for supplying a conveyed object configured to store drugs;

a drug supply means for supplying predetermined drugs to the conveyed object supplied from the conveyed object supply means; and the dosing system according to claim 2, wherein the dosing system is configured to perform a display change operation of changing the display information on the display part provided in the conveyed object.

4. The dosing system of claim 3, wherein the display part is configured to continuously display the information without supply of an electric power after displaying the information.

5. The dosing system of claim 4, wherein the display part is formed in a card fitted to a side surface of the conveyed object.

6. The dosing system of claim 3, wherein the display part is formed in a card fitted to a side surface of the conveyed object.

7. A dosing system, comprising:

a conveyed object supply means for supplying a conveyed object configured to store drugs;

a drug supply means for supplying predetermined drugs to the conveyed object supplied from the conveyed object supply means; and the dosing system according to claim 1, wherein the dosing system is configured to perform a display change operation of changing the display information on the display part provided in the conveyed object.

8. The dosing system of claim 7, wherein the display part is configured to continuously display the information without supply of an electric power after displaying the information.

9. The dosing system of claim 8, wherein the display part is formed in a card fitted to a side surface of the conveyed object.

10. The dosing system of claim 7, wherein the display part is formed in a card fitted to a side surface of the conveyed object.

* * * * *